US012503016B2

(12) United States Patent
Napau et al.

(10) Patent No.: US 12,503,016 B2
(45) Date of Patent: Dec. 23, 2025

(54) VEHICLE SEAT ADJUSTMENT ASSEMBLY WITH REDUCED-BACKLASH GEAR SYSTEM

(71) Applicant: Fisher & Company, Incorporated, St. Clair Shores, MI (US)

(72) Inventors: Mircea Napau, Sterling Heights, MI (US); Ileana Dacia Napau, Cugir (RO); Ioan Napau, Rochester Hills, MI (US)

(73) Assignee: Fisher & Company, Incorporated, St. Clair Shores, MI (US)

( * ) Notice: Subject to any disclaimer, the term of this patent is extended or adjusted under 35 U.S.C. 154(b) by 0 days.

(21) Appl. No.: 18/378,770

(22) Filed: Oct. 11, 2023

(65) Prior Publication Data

US 2024/0131966 A1    Apr. 25, 2024

Related U.S. Application Data

(60) Provisional application No. 63/415,483, filed on Oct. 12, 2022.

(51) Int. Cl.
*B60N 2/16*    (2006.01)
*B60N 2/02*    (2006.01)
(Continued)

(52) U.S. Cl.
CPC ......... *B60N 2/165* (2013.01); *B60N 2/02246* (2023.08); *B60N 2/14* (2013.01); *B60N 2/2251* (2013.01); *B60N 2/12* (2013.01)

(58) Field of Classification Search
CPC ......... F16H 2057/125; F16H 2057/127; B60N 2/165; B60N 2205/20
See application file for complete search history.

(56) References Cited

U.S. PATENT DOCUMENTS

| 546,249 A | 9/1895 | Regan |
|---|---|---|
| 657,542 A | 9/1900 | Ingersoll |

(Continued)

FOREIGN PATENT DOCUMENTS

| CN | 87101620 A | 9/1988 |
|---|---|---|
| CN | 1109566 A | 10/1995 |

(Continued)

OTHER PUBLICATIONS

German Office Action regarding Patent Application No. 102021204240.6, dated May 16, 2024.

(Continued)

*Primary Examiner* — Jake Cook
(74) *Attorney, Agent, or Firm* — Harness, Dickey & Pierce, P.L.C.

(57) ABSTRACT

A seat adjustment mechanism includes a first component and a second component movable relative to the first component. A drive mechanism is drivingly connected to the second component for moving the second component relative to the first component. The drive mechanism includes a drive motor drivingly connected to a first gear member having conical involute teeth. A second gear member includes conical involute teeth in meshing engagement with the conical involute teeth of the first gear member. The conical involute teeth have a tapered tooth thickness, a tapered root and a tapered outside diameter.

21 Claims, 27 Drawing Sheets

(51) Int. Cl.
*B60N 2/12* (2006.01)
*B60N 2/14* (2006.01)
*B60N 2/225* (2006.01)

(56) References Cited

U.S. PATENT DOCUMENTS

| | | |
|---|---|---|
| 978,371 A | 12/1910 | Harrison |
| 1,192,627 A | 7/1916 | Hatlee |
| 1,694,031 A | 12/1928 | Braren |
| 1,770,035 A | 7/1930 | Heap et al. |
| 2,168,164 A | 8/1939 | Kittredge |
| 2,170,951 A | 8/1939 | Perry |
| 2,250,259 A | 7/1941 | Foote, Jr. |
| 2,475,504 A | 7/1949 | Jackson |
| 2,508,121 A | 5/1950 | McIver |
| 2,609,713 A | 9/1952 | Martin |
| 2,972,910 A | 2/1961 | Menge, Sr. |
| 2,995,226 A | 8/1961 | Gilder |
| 3,013,447 A | 12/1961 | Hils et al. |
| 3,037,400 A | 6/1962 | Sundt |
| 3,144,791 A | 8/1964 | Menge, Sr. |
| 3,319,482 A | 5/1967 | Campbell et al. |
| 3,427,901 A | 2/1969 | Wildhaber |
| 3,451,290 A | 6/1969 | Wildhaber |
| 3,965,773 A | 6/1976 | Bert et al. |
| 4,023,441 A | 5/1977 | Osterwalder |
| 4,228,698 A | 10/1980 | Winiasz |
| 4,228,739 A | 10/1980 | Fitzgibbon |
| 4,269,075 A | 5/1981 | Crist et al. |
| 4,452,102 A | 6/1984 | Shaffer |
| 4,720,073 A | 1/1988 | Mann et al. |
| 4,721,337 A | 1/1988 | Tomita |
| 4,805,866 A | 2/1989 | Aihara et al. |
| 4,884,844 A | 12/1989 | Kershaw et al. |
| 4,930,367 A | 6/1990 | Nagasawa |
| 4,967,615 A | 11/1990 | Mills |
| 5,030,184 A | 7/1991 | Rennerfelt |
| 5,094,420 A | 3/1992 | Aihara et al. |
| 5,099,717 A | 3/1992 | Ochiai et al. |
| 5,222,402 A | 6/1993 | White et al. |
| 5,259,257 A | 11/1993 | Mouri |
| 5,292,164 A | 3/1994 | Rees |
| 5,314,158 A | 5/1994 | Mouri |
| 5,349,878 A | 9/1994 | White et al. |
| 5,425,683 A | 6/1995 | Bang |
| 5,505,668 A | 4/1996 | Koriakov-Savoysky et al. |
| 5,598,746 A | 2/1997 | Chen |
| 5,701,783 A | 12/1997 | Lin |
| 5,816,555 A | 10/1998 | Ito et al. |
| 5,865,506 A | 2/1999 | Sakamoto |
| 6,032,550 A | 3/2000 | Rugh |
| 6,138,974 A | 10/2000 | Okada et al. |
| D437,334 S | 2/2001 | Song |
| 6,220,642 B1 | 4/2001 | Ito et al. |
| 6,244,660 B1 | 6/2001 | Yoshimatsu |
| 6,260,672 B1 | 7/2001 | Frohnhaus et al. |
| 6,260,922 B1 | 7/2001 | Frohnhaus et al. |
| 6,261,199 B1 | 7/2001 | Schlangen |
| 6,322,146 B1 | 11/2001 | Fisher, Jr. |
| 6,548,332 B2 | 4/2003 | Peng et al. |
| 6,742,409 B2 | 6/2004 | Blanchard |
| 6,820,851 B2 | 11/2004 | Mochizuki et al. |
| 6,915,998 B2 | 7/2005 | Borbe et al. |
| 6,986,493 B2 | 1/2006 | Yokota |
| 7,041,024 B2 | 5/2006 | Becker et al. |
| 7,048,244 B2 | 5/2006 | Hauck |
| 7,051,986 B1 | 5/2006 | Taubmann et al. |
| 7,143,513 B2 | 12/2006 | Taubmann et al. |
| 7,198,243 B2 | 4/2007 | Hofschulte et al. |
| 7,313,982 B2 | 1/2008 | Wisner et al. |
| 7,322,257 B2 | 1/2008 | Becker et al. |
| 7,340,974 B2 | 3/2008 | Landskron et al. |
| 7,437,962 B2 | 10/2008 | Taubmann et al. |
| 7,571,666 B2 | 8/2009 | Borbe et al. |
| 7,703,347 B2 | 4/2010 | Porinsky et al. |
| 7,887,020 B2 | 2/2011 | Ferguson et al. |
| 8,061,228 B2 | 11/2011 | Becker et al. |
| 8,061,756 B2 | 11/2011 | Kimata et al. |
| 8,087,974 B2 | 1/2012 | Maeda et al. |
| 8,113,074 B2 | 2/2012 | Wohrle et al. |
| 8,128,051 B2 | 3/2012 | Koga et al. |
| 8,171,823 B2 | 5/2012 | Koga et al. |
| 8,453,529 B2 | 6/2013 | Birker et al. |
| 8,485,489 B2 | 7/2013 | Hofschulte et al. |
| 8,548,687 B2 | 10/2013 | Jefferies et al. |
| 8,777,794 B2 | 7/2014 | Oishi |
| 8,826,756 B2 | 9/2014 | Hoffmann et al. |
| 8,864,231 B2 | 10/2014 | Shimoda et al. |
| 8,904,895 B2 | 12/2014 | Woehrle et al. |
| 8,998,324 B2 | 4/2015 | Kitaguchi et al. |
| 9,079,511 B2 | 7/2015 | Jefferies et al. |
| 9,145,068 B2 | 9/2015 | Bosecker et al. |
| 9,180,795 B2 | 11/2015 | Flieger et al. |
| 9,205,763 B2 | 12/2015 | Anticuar et al. |
| 9,415,713 B2 | 8/2016 | Line et al. |
| 9,421,891 B2 | 8/2016 | Andres et al. |
| 9,604,550 B2 | 3/2017 | Ito |
| 9,689,464 B2 | 6/2017 | Hamakita |
| 9,694,724 B2 | 7/2017 | Nagata et al. |
| 9,827,879 B2 | 11/2017 | Fujita et al. |
| 9,902,295 B2 | 2/2018 | Napau et al. |
| 10,021,991 B2 | 7/2018 | Klimm |
| 10,024,392 B2 | 7/2018 | Napau et al. |
| 10,195,975 B2 | 2/2019 | Becker et al. |
| 10,208,835 B2 | 2/2019 | Noguchi et al. |
| 10,220,730 B2 | 3/2019 | Nagata et al. |
| 10,220,732 B2 | 3/2019 | Auer et al. |
| 10,300,812 B2 | 5/2019 | Flieger et al. |
| 10,336,217 B2 * | 7/2019 | Ikeda ............... B60N 2/165 |
| 10,369,912 B2 * | 8/2019 | Asai ................. G05G 5/24 |
| 10,486,554 B2 | 11/2019 | Napau et al. |
| 10,500,984 B2 | 12/2019 | Hoffmann |
| 10,562,411 B2 | 2/2020 | Higuchi et al. |
| 10,737,591 B2 | 8/2020 | Ito |
| 10,843,591 B2 | 11/2020 | Becker et al. |
| 10,857,910 B2 | 12/2020 | Madhu |
| 10,882,567 B2 | 1/2021 | Schulz et al. |
| 10,933,771 B2 | 3/2021 | Geiges et al. |
| 10,953,772 B2 | 3/2021 | Napau et al. |
| 11,077,774 B2 * | 8/2021 | Napau ............... B60N 2/2254 |
| 11,180,064 B2 | 11/2021 | Navatte et al. |
| 11,273,506 B2 | 3/2022 | Napau et al. |
| 11,485,255 B2 | 11/2022 | Napau et al. |
| 11,529,892 B2 | 12/2022 | Napau et al. |
| 2003/0080599 A1 | 5/2003 | Hohn et al. |
| 2004/0022167 A1 | 2/2004 | Nankumo |
| 2004/0206195 A1 | 10/2004 | Landskron et al. |
| 2004/0254041 A1 | 12/2004 | Becker et al. |
| 2005/0082890 A1 | 4/2005 | Taubmann et al. |
| 2005/0116132 A1 | 6/2005 | Sakamaki |
| 2005/0126333 A1 | 6/2005 | Dohles et al. |
| 2005/0146174 A1 | 7/2005 | Maddelein et al. |
| 2005/0253036 A1 | 11/2005 | Li et al. |
| 2005/0269478 A1 | 12/2005 | Woehrle et al. |
| 2006/0084547 A1 | 4/2006 | Dill et al. |
| 2006/0117885 A1 | 6/2006 | Robson et al. |
| 2006/0213302 A1 | 9/2006 | Hoffmann et al. |
| 2006/0249644 A1 | 11/2006 | Folliot et al. |
| 2007/0029893 A1 | 2/2007 | Schuler et al. |
| 2007/0108360 A1 | 5/2007 | Ito et al. |
| 2007/0209857 A1 | 9/2007 | Wolf |
| 2007/0241602 A1 | 10/2007 | Thiel et al. |
| 2008/0197654 A1 | 8/2008 | Livesey et al. |
| 2008/0261743 A1 | 10/2008 | Junkers |
| 2009/0045661 A1 | 2/2009 | Stoessel et al. |
| 2010/0139425 A1 | 6/2010 | Schulz et al. |
| 2010/0237216 A1 | 9/2010 | Napau et al. |
| 2010/0320352 A1 | 12/2010 | Weber |
| 2011/0079699 A1 | 4/2011 | Tarusawa et al. |
| 2011/0308340 A1 | 12/2011 | Bosecker et al. |
| 2012/0325033 A1 | 12/2012 | Bosecker et al. |
| 2013/0180348 A1 | 7/2013 | Andres et al. |
| 2013/0333496 A1 | 12/2013 | Boutouil et al. |
| 2014/0238188 A1 | 8/2014 | Ito |

(56) References Cited

U.S. PATENT DOCUMENTS

| | | | |
|---|---|---|---|
| 2015/0020955 | A1 | 1/2015 | Hoffmann et al. |
| 2015/0059505 | A1 | 3/2015 | Enokijima |
| 2015/0210187 | A1 | 7/2015 | Harleb et al. |
| 2015/0283924 | A1 | 10/2015 | Boutouil et al. |
| 2015/0360587 | A1 | 12/2015 | Hoffmann et al. |
| 2016/0257223 | A1 | 9/2016 | Markel et al. |
| 2016/0325643 | A1* | 11/2016 | Klein-Hitpass ......... F16H 57/12 |
| 2016/0341214 | A1 | 11/2016 | O'Toole et al. |
| 2017/0059017 | A1 | 3/2017 | Napau et al. |
| 2017/0203677 | A1 | 7/2017 | Becker et al. |
| 2017/0253145 | A1 | 9/2017 | Runde et al. |
| 2017/0307053 | A1 | 10/2017 | Riester et al. |
| 2018/0065507 | A1 | 3/2018 | Napau et al. |
| 2018/0201158 | A1 | 7/2018 | Hoffmann |
| 2018/0334054 | A1 | 11/2018 | Higuchi et al. |
| 2019/0152347 | A1 | 5/2019 | Becker et al. |
| 2019/0168636 | A1 | 6/2019 | Higuchi |
| 2019/0202322 | A1 | 7/2019 | Napau et al. |
| 2019/0381915 | A1 | 12/2019 | Taniguchi et al. |
| 2020/0215936 | A1 | 7/2020 | Teer et al. |
| 2020/0223329 | A1 | 7/2020 | Dry et al. |
| 2020/0262317 | A1 | 8/2020 | Napau et al. |
| 2021/0016375 | A1 | 1/2021 | Napau et al. |
| 2021/0252997 | A1 | 8/2021 | Gropp et al. |
| 2024/0034201 | A1 | 2/2024 | Fisher, III et al. |

FOREIGN PATENT DOCUMENTS

| | | |
|---|---|---|
| CN | 1251411 A | 4/2000 |
| CN | 1309750 A | 8/2001 |
| CN | 101178116 A | 5/2008 |
| CN | 101448674 A | 6/2009 |
| CN | 201350516 Y | 11/2009 |
| CN | 101970900 A | 2/2011 |
| CN | 102510817 A | 6/2012 |
| CN | 101528502 B | 8/2012 |
| CN | 103095041 A | 5/2013 |
| CN | 103101455 A | 5/2013 |
| CN | 203146709 U | 8/2013 |
| CN | 103498891 A | 1/2014 |
| CN | 204226562 U | 3/2015 |
| CN | 104520140 A | 4/2015 |
| CN | 104802666 A | 7/2015 |
| CN | 204774719 U | 11/2015 |
| CN | 204774722 U | 11/2015 |
| CN | 105270212 A | 1/2016 |
| CN | 105599643 A | 5/2016 |
| CN | 107804196 A | 3/2018 |
| CN | 207078030 U | 3/2018 |
| CN | 108426103 A | 8/2018 |
| CN | 208306408 U | 1/2019 |
| CN | 208324966 U | 1/2019 |
| CN | 109538741 A | 3/2019 |
| CN | 110475691 A | 11/2019 |
| DE | 1755740 A1 | 1/1972 |
| DE | 3107455 A1 | 10/1982 |
| DE | 19815283 A1 | 10/1999 |
| DE | 19861100 A1 | 2/2000 |
| DE | 19911432 A1 | 9/2000 |
| DE | 10139631 A1 | 3/2003 |
| DE | 10250994 A1 | 8/2003 |
| DE | 10247204 A1 | 4/2004 |
| DE | 10203983 B4 | 5/2004 |
| DE | 10327103 A1 | 12/2004 |
| DE | 102004013543 A1 | 10/2005 |
| DE | 102005044467 B3 | 3/2007 |
| DE | 202008016335 U1 | 3/2009 |
| DE | 102009006815 A1 | 8/2009 |
| DE | 102013009846 A1 | 12/2013 |
| DE | 10362326 B4 | 2/2014 |
| DE | 102015212823 B3 | 8/2016 |
| DE | 102015205440 A1 | 9/2016 |
| DE | 102017100934 A1 | 7/2017 |
| DE | 102017008036 A1 | 3/2018 |
| DE | 102018207671 A1 | 11/2018 |
| DE | 102019125196 A1 | 2/2021 |
| DE | 102021204240 A1 | 11/2021 |
| EP | 0450324 A2 | 10/1991 |
| EP | 0617213 A1 | 9/1994 |
| EP | 0848672 B1 | 12/1999 |
| EP | 0992711 A2 | 4/2000 |
| EP | 1068093 A1 | 1/2001 |
| EP | 1167113 A1 | 1/2002 |
| EP | 1026027 B1 | 3/2004 |
| EP | 1442923 A2 | 8/2004 |
| EP | 1601550 B1 | 10/2012 |
| FR | 679410 A | 4/1930 |
| FR | 2517018 A3 | 5/1983 |
| FR | 2872747 A1 | 1/2006 |
| FR | 2882975 A1 | 9/2006 |
| GB | 2389066 A | 12/2003 |
| GB | 2404704 A | 2/2005 |
| JP | S62184939 A | 8/1987 |
| JP | H08197988 A | 8/1996 |
| JP | 2010112553 A | 5/2010 |
| JP | 2015134513 A | 7/2015 |
| JP | 2018203208 A | 12/2018 |
| KR | 20090071616 A | 7/2009 |
| KR | 101470180 B1 | 12/2014 |
| KR | 101501384 B1 | 3/2015 |
| KR | 101518647 B1 | 5/2015 |
| KR | 101708126 B1 | 2/2017 |
| WO | 8606036 A1 | 10/1986 |
| WO | 9709192 A1 | 3/1997 |
| WO | 03074209 A2 | 9/2003 |
| WO | 2009092946 A2 | 7/2009 |
| WO | 2010116125 A1 | 10/2010 |
| WO | 2011098161 A1 | 8/2011 |
| WO | 2011137989 A1 | 11/2011 |
| WO | 2012150050 A1 | 11/2012 |
| WO | 2013010888 A2 | 1/2013 |
| WO | 2015161714 A1 | 10/2015 |
| WO | 2018221977 A1 | 12/2018 |

OTHER PUBLICATIONS

International Search Report and Written Opinion of the ISA, issued in PCT/US2023/034992, mailed Jan. 24, 2024; ISA/US (10 pages).

International Search Report regarding International Application No. PCT/US2016/048649, dated Nov. 28, 2016.

Written Opinion of the International Searching Authority regarding International Application No. PCT/US2016/048649, dated Nov. 28, 2016.

International Search Report regarding International Application No. PCT/US2016/048634, dated Dec. 21, 2016.

Written Opinion of the International Searching Authority regarding International Application No. PCT/US2016/048634, dated Dec. 21, 2016.

Office Action regarding German Patent Application No. 102017008036.4, dated Apr. 5, 2018.

Office Action regarding Korean Patent Application No. 10-2017-0114314, dated Sep. 28, 2018.

Office Action regarding Korean Patent Application No. 10-2017-0114314, dated Mar. 27, 2019.

International Search Report regarding International Application No. PCT/US2019/021870, dated Jun. 25, 2019.

Written Opinion of the International Searching Authority regarding International Application No. PCT/US2019/021870, dated Jun. 25, 2019.

Office Action regarding Chinese Patent Application No. 201710791607.X, dated Aug. 5, 2019.

Office Action regarding Korean Patent Application No. 10-2017-0114314, dated Sep. 9, 2019.

International Search Report regarding International Application No. PCT/US2020/012857, dated Apr. 29, 2020.

Written Opinion of the International Searching Authority regarding International Application No. PCT/US2020/012857, dated Apr. 29, 2020.

Office Action regarding Chinese Patent Application No. 201710791607.X, dated Apr. 21, 2020.

(56) References Cited

OTHER PUBLICATIONS

Dicker Jr. et al., "Worms and Worm Gears." Theory of Machines and Mechanisms, 3rd ed., Oxford University Press, 2003, pp. 306-310.
Office Action regarding German Patent Application No. 102020200205.3, dated Aug. 20, 2020. Partial translation provided by Bardehle Pagenberg Partnerschaft mbB.
Office Action regarding German Patent Application No. 102017008036.4, dated Jul. 17, 2020.
Office Action regarding German Patent Application No. 112019000026.8, dated Sep. 25, 2020. Partial translation provided by Bardehle Pagenberg Partnerschaft mbB.
Office Action regarding Chinese Patent Application No. 201710791607.X, dated Dec. 22, 2020.
Office Action regarding German Patent Application No. 102017100934.5, dated Jan. 27, 2021. Translation provided by Witte, Weller & Partner Patentanwälte mbB.
Office Action regarding Korean Patent Application No. 10-2019-7026939, dated Feb. 19, 2021. Translation provided by Koryo IP & Law.
Office Action for U.S. Appl. No. 17/062,931, dated Sep. 9, 2021.
Office Action regarding Chinese Patent Application No. 202010075280.8 dated Nov. 26, 2021.
Office Action regarding Chinese Patent Application No. 202010104705.3 dated Feb. 7, 2022.
Notice of Allowance regarding U.S. Appl. No. 17/236,639 dated Apr. 18, 2022.
Office Action regarding German Patent Application No. 1020170080364, dated May 24, 2022.
Office Action for U.S. Appl. No. 16/737,991, dated May 27, 2022.
Office Action regarding Chinese Patent Application No. 2020101047053, dated Jul. 14, 2022.
Notice of Allowance regarding U.S. Appl. No. 17/236,639 dated Aug. 23, 2022.
Notice of Allowance regarding U.S. Appl. No. 17/553,445 dated Sep. 8, 2022.
Office Action regarding German Patent Application No. 1020170080364, dated May 17, 2022.
Office Action regarding German Patent Application No. 1020202002053, dated Sep. 8, 2022.
Non-Final Office Action regarding U.S. Appl. No. 16/787,420 dated Oct. 6, 2022.
Office Action regarding Chinese Patent Application No. 2020101047053, dated Oct. 27, 2022.
Office Action regarding Chinese Patent Application No. 2020800083671, dated Dec. 5, 2022.
Office Action regarding Chinese Patent Application No. 2021104836972, dated Jan. 20, 2023.
Non-Final Office Action regarding U.S. Appl. No. 17/493,287 dated Apr. 18, 2023.
Final Office Action regarding U.S. Appl. No. 16/787,420 dated Apr. 25, 2023.
Notice of Allowance regarding U.S. Appl. No. 16/787,420 dated Jul. 18, 2023.
Notice of Allowance regarding U.S. Appl. No. 17/493,287 dated Jul. 31, 2023.
German Office Action from Application No. 10 2022 213 240.8 dated Sep. 5, 2023.
German Office Action regarding Patent Application No. 102020201929.0, dated Jul. 24, 2023.
Non-Final Office Action regarding U.S. Appl. No. 18/377,894 dated May 22, 2025.

\* cited by examiner

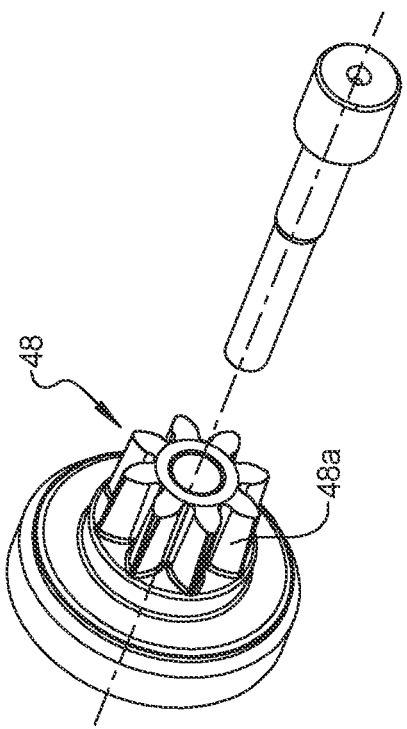
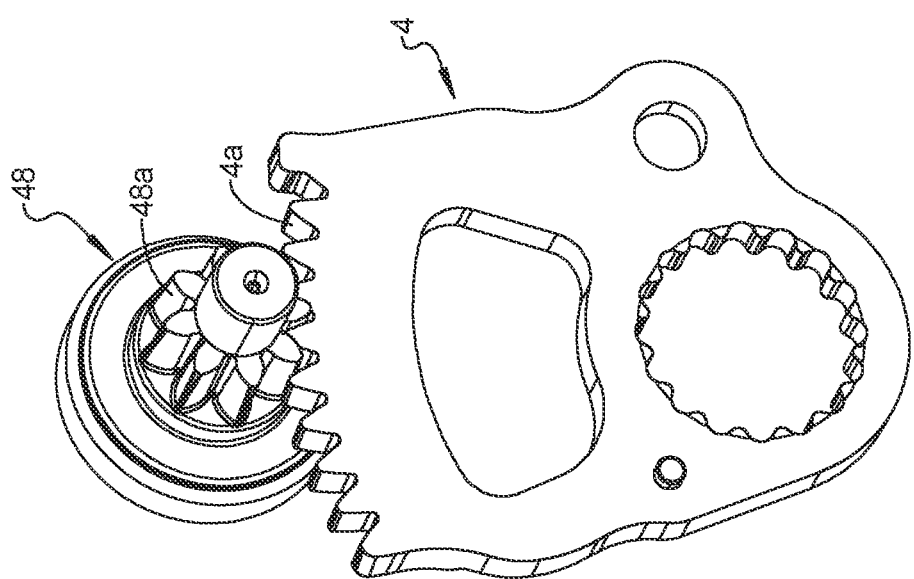
FIG. 2B
FIG. 2A

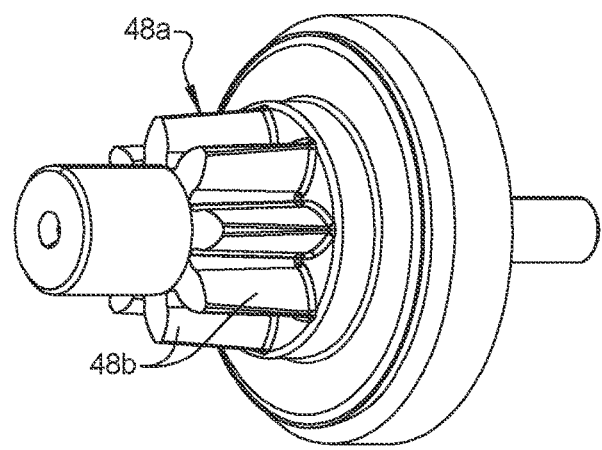
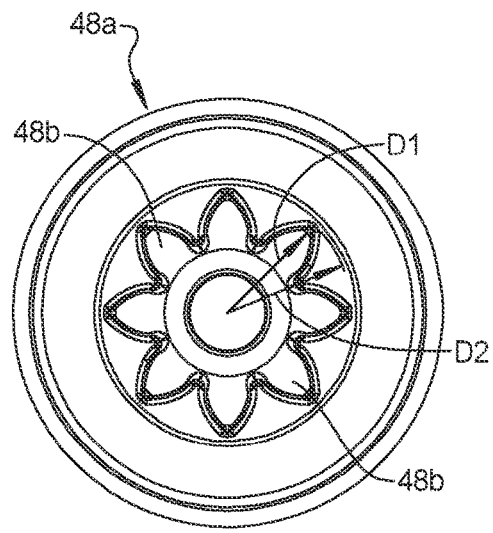
FIG. 3A   FIG. 3B
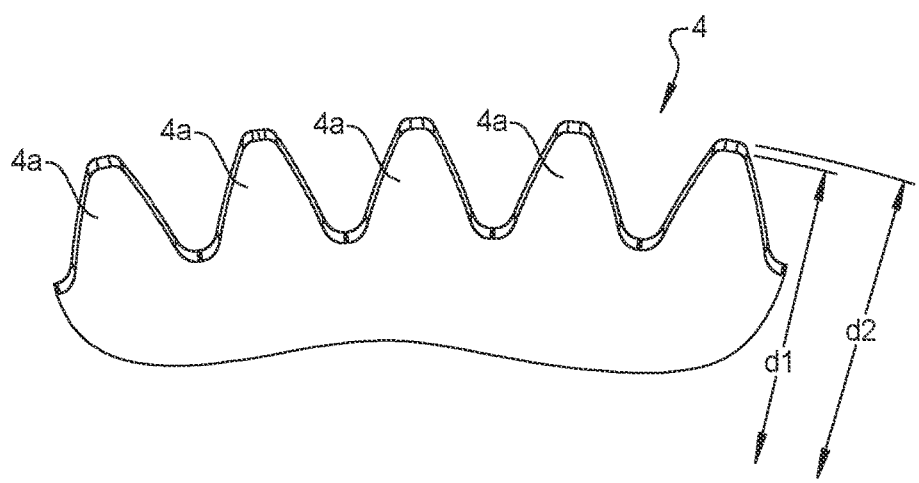
FIG. 4

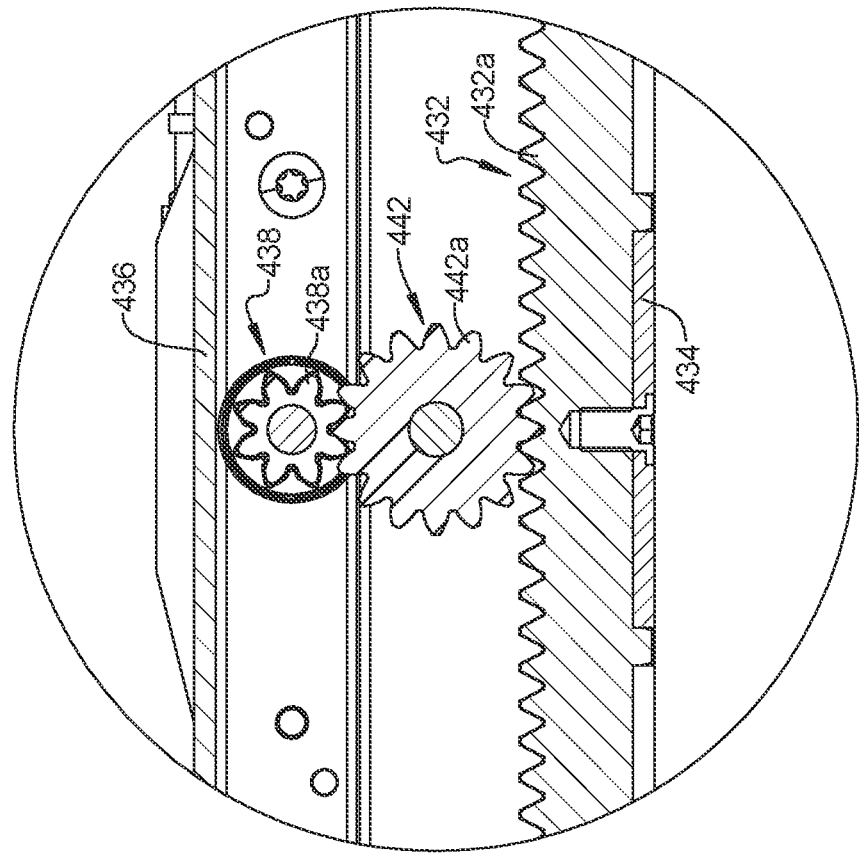
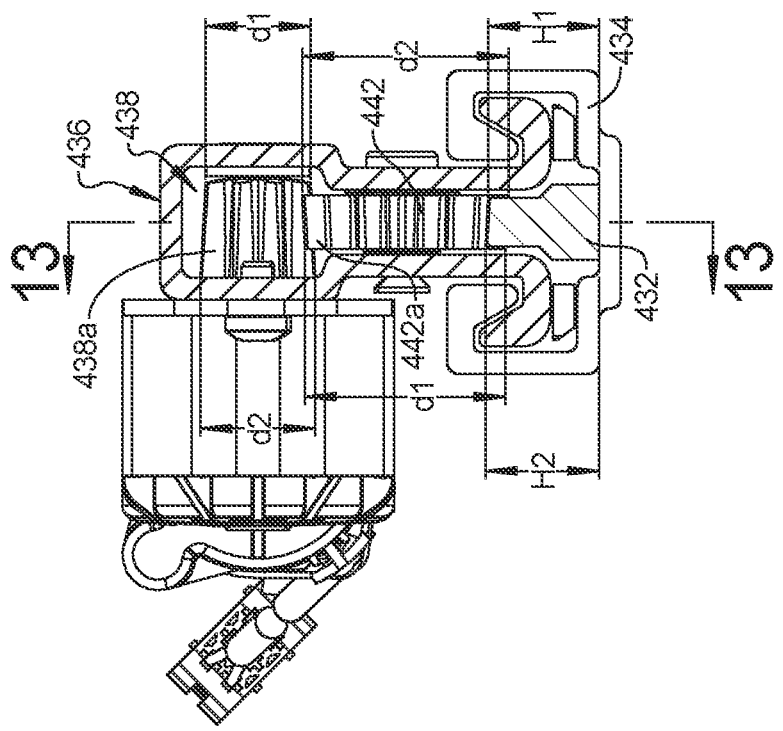
FIG. 13
FIG. 12

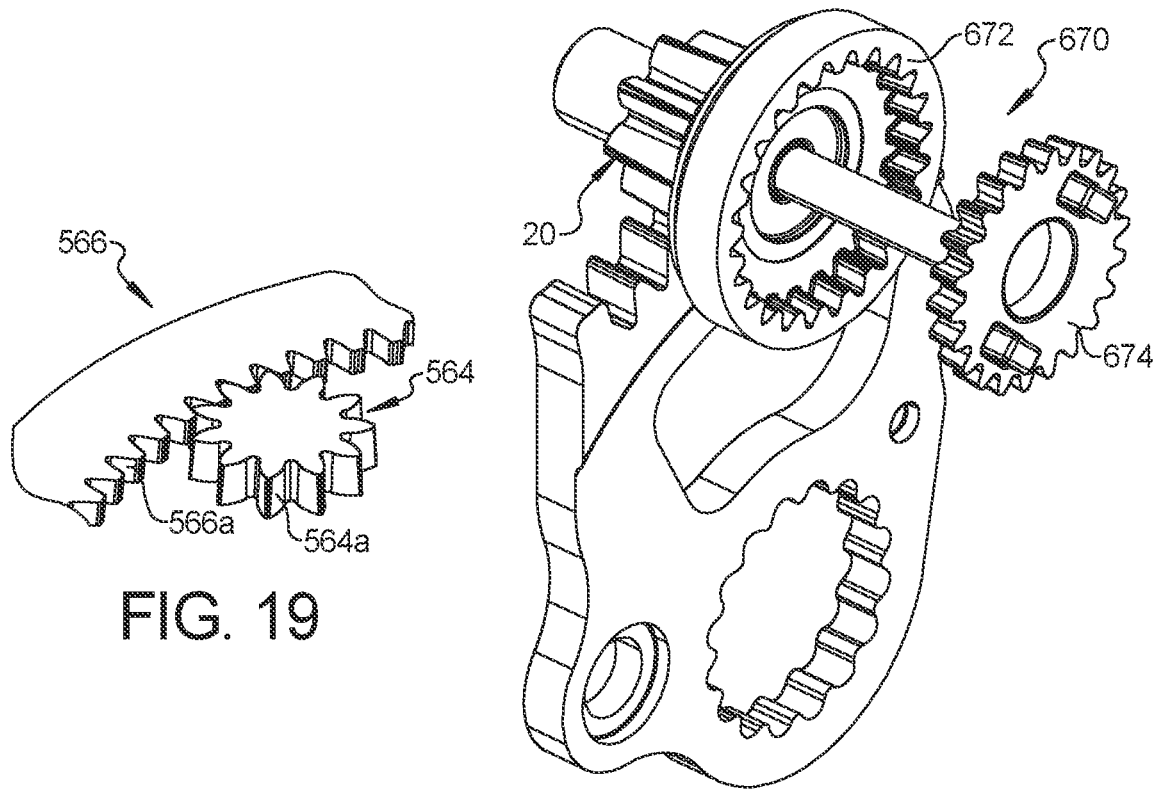
FIG. 19
FIG. 20A
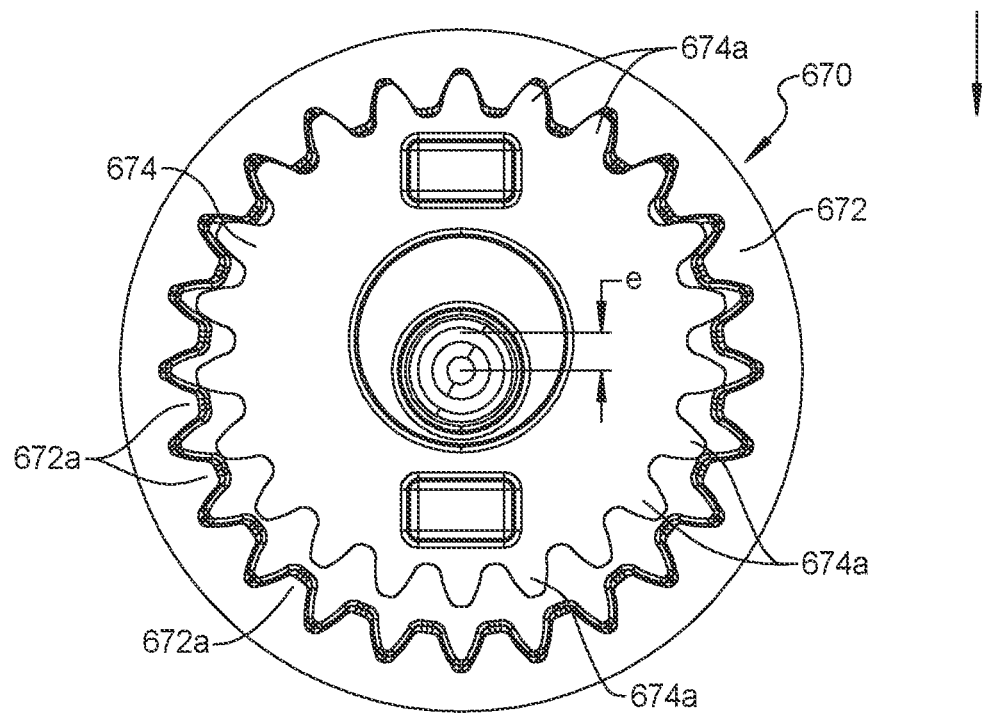
FIG. 20B

VEHICLE SEAT ADJUSTMENT ASSEMBLY WITH REDUCED-BACKLASH GEAR SYSTEM

CROSS-REFERENCE TO RELATED APPLICATIONS

This application claims the benefit of U.S. Provisional Application No. 63/415,483, filed on Oct. 12, 2022. The entire disclosure of the above application is incorporated herein by reference.

FIELD

The present disclosure relates to a vehicle seat adjustment assembly with reduced-backlash gear system.

BACKGROUND

This section provides background information related to the present disclosure which is not necessarily prior art.

The present disclosure relates generally to gear reduction mechanisms used in automotive seat adjusters and, more specifically to an output single-stage gear reduction mechanism with anti-back drive capability, improved mechanical efficiency and reduced backlash gear system, used only in combination with an input first-stage gear reduction mechanism, in electrically actuated gear drives for adjustment of a seat height and/or tilt position in an automotive vehicle.

There are an increasing number of electrical actuators in a vehicle, such as windows, rear-view mirrors, seats, window screen wipers, antennas, spoilers, roofs, hoods, oil pumps or water pumps. All these functions are driven by electric motors; the size of the motor being directly linked to the torque it must provide to produce the required motion. Thus, if a reasonably high reduction gear ratio can be achieved in a very limited space, smaller and faster electric motors can be used to provide the same level of mechanical power needed for the required function.

Generally speaking, gear drives used in automotive interior actuators can perform several useful functions: reduce or increase the speed, multiply or decrease the torque, and reverse the direction of rotation. Specifically, gear drives used in automotive seat adjuster actuators serve to reduce the electric motor input speed while increasing the input torque. The most important requirements for the gear drives used in automotive vehicle interior adjusters, not necessarily in this order, are the range of reduction ratio; the range of output torque; the size and weight of the gear drive; the efficiency; the level of noise; the shock load capability; the cost; the life of the gear drive; and the amount of backlash. For some applications, such as those used in adjusting and maintaining the adjusted position of a vehicle seat, a special requirement called anti-back drive capability, sometimes also called non-back drive capability, or self-locking capability is a must and is characterized by the fact that while the electric motor input shaft high speed and low torque can be transferred to a low speed high torque output shaft, in either, clockwise (CW) or counter-clockwise (CCW) direction of rotation, any attempt to transfer back the torque from the output shaft to the input shaft, due to an external load (e.g. occupant weight or external reaction forces in case of a crash accident, etc.) is prevented, thus not only protecting against the possibility of damaging the electric motor, but also, assuring the conservation of the adjusted vehicle seat position.

Gear mechanisms with anti-back drive capabilities, which multiply the torque and reduce the speed in either a clockwise or counter clockwise direction of rotation are not new. The worm and worm-wheel gear drives have been used successfully for many years as a safety or self-locking device and as one that can avoid a need for an external brake or a clutch mechanism. However, the disadvantages of the worm and worm-wheel or a worm-helical gear are that the anti-back drive capability is achieved only if the reduction ratio is in the order of 25:1 or larger, leading to a relatively low mechanical efficiency. Theoretically, the maximum efficiency of such gear drives with anti-back drive capability is 50%. Moreover, there is no 100% proven guarantee that anti-back drive capability will be provided in any operating conditions, such as in the presence of unwanted dynamic vibrations.

In addition to the anti-back drive capability and increased operating efficiency requirements, gear reduction mechanisms used in vehicle seat height and tilt adjusters have some more specific requirements: a relatively high gear ratio, typically in the range of (300:1-700:1), in a very compact space, reduced noise in operation and a very competitive low price of manufacturing and assembly. Thus, a practical solution of a coaxial or an orthogonal gear transmission capable to meet all the above-mentioned requirements using only a single-stage reduction mechanism is not possible, typically a two-stage gear transmission solution being pursued, in which the second-stage that provides the output torque and speed is mandatory to provide the anti-back drive capability.

Usually, such transmissions exploit the properties of single-stage planetary gear drives which use an eccentric to drive the planetary gear for providing high gear ratios in a very compact space and different coupling or compensating means arrangements to prevent the rotation of the planetary gear about its own axis of rotation thus providing the anti-back drive capability. Such coupling or compensating means arrangements are based on reciprocating sliding action, rolling contact action or wedging action, the first two-types being taken into consideration hereinafter.

Gears are normally designed with some backlash in order to prevent possible flank interferences due to deviation from ideal geometries, unfavorable deformations and temperature effects while in operation. However, in some mechanical applications one aims for as little backlash as possible, since such backlash normally reduces precision and makes the control of the machine very difficult. Very precise gears and mountings reduce or eliminate the backlash but, high-precision gearing is an expensive means of limiting backlash. Therefore, special design, fabrication, and assembly methods have been developed to permit the use of imperfect gears and associated parts without the drawback of significant backlash. The current seating engineering approach to eliminate the backlash consists currently in two methods: Meshing the pinion/sector gear tightly by adjusting the center distance of the gear pair ("crowding" assembly process). Another approach when the center distance cannot be changed is to use an oversized tooth-thickness for pinion hopping that by assembly process in mesh with the sector gear teeth a double flank action can be achieved.

Both of the above methods can induce high contact stress on the pinion and sector gear teeth flanks with significant risk of strong friction torque variation and implicitly less surface durability of the teeth flanks. But this variation is one of the main contributors for noise and vibrations. This is especially the case if the gears are stiffly pressed to each other. It happens that the efficiency at times is as low as 50% although the gears are of precision type and the assembly has been made carefully. However, it has been observed that the friction variation and level will decrease with running time. Whether that is an effect of improved lubrication or running-in wear or both is not clear.

SUMMARY

This section provides a general summary of the disclosure, and is not a comprehensive disclosure of its full scope or all of its features.

The present disclosure is directed to gear systems for vehicle seat adjustment assemblies. The gear systems have relatively little or no backlash. Various configurations of these gear systems can be incorporated into vehicle seat adjustment assemblies (i.e., seat swivel assemblies, seat tilt assemblies, seat recline assemblies, seat height adjuster assemblies, seat length (fore-aft) adjuster assemblies, and other types of vehicle seat adjustment assemblies).

The present disclosure provides a gear system that may respond to such demands of minimum backlash. One example is a conical involute gear system. This gear is an involute gear, which has tapered tooth thickness, tapered root and tapered outside diameter. Each transverse tooth profile represents a spur gear with different degrees of addendum modification and tip radius. The backlash can be eliminated by keeping one of the two gears fixed and moving the other one (usually the pinion) in an axial direction without affecting its center distance. Conical involute gear can be produced by the same CNC hobbing or grinding machines that are commonly employed for the manufacturing of cylindrical involute gears. Special forging, pinion cutter shaping and most recently powder metal manufacturing processes may also be employed. There are many vehicle seat applications in which it is desirable to eliminate or reduce the backlash between a pair of gears. Several examples of such applications are disclosed herein.

According to an aspect of the present disclosure, a seat adjustment mechanism includes a first component and a second component movable relative to the first component. A drive mechanism is drivingly connected to the second component for moving the second component relative to the first component. The drive mechanism includes a drive motor drivingly connected to a first gear member having conical involute teeth. A second gear member includes conical involute teeth in meshing engagement with the conical involute teeth of the first gear member. The conical involute teeth have a tapered tooth thickness, a tapered root and a tapered outside diameter.

According to a further aspect, the first gear member is a pinion gear.

According to a further aspect, the second gear member is a sector gear.

According to a further aspect, the first component is a seat bottom and the second component is a seat back.

According to a further aspect, the second gear member is a rack.

According to a further aspect, the first component is a rail and the second component is a slide unit on which a seat base is mounted.

According to a further aspect, the second gear member is a ring.

According to a further aspect, the first component is a vehicle floor and the second component is a seat that is swivelable relative to the vehicle floor.

According to a further aspect, the first component is a seat bottom and the second component is a seat back and the drive mechanism is a recliner mechanism for moving the seat back relative to the seat bottom.

According to a further aspect, the first component is a rail and the second component is a slide unit on which a seat base is mounted and the drive mechanism is a seat adjustment mechanism for moving the slide unit relative to the rail.

According to a further aspect, the resilient member is a wave spring.

According to a further aspect, the resilient member is made from a resilient material.

According to a further aspect, the drive mechanism includes a gear reduction mechanism providing a driving connection between the drive motor and the first gear member.

According to a further aspect, the gear reduction mechanism includes an eccentric rotatably connected to the drive motor and a fork-like locking plate that engages the eccentric and one of a planetary gear and a ring gear and the other of the planetary gear and the ring gear is drivingly connected to the first gear member.

According to a further aspect, the planetary gear includes exterior conical involute teeth and the ring gear includes interior conical involute teeth.

According to a further aspect, the fork-like locking plate engages two pins on the one of the planetary gear and the ring gear.

According to a further aspect, the gear reduction mechanism includes an eccentric rotatably connected to the drive motor and engaged with a wobbling planetary gear with exterior conical involute teeth that engage interior conical involute teeth of a ring gear that is drivingly connected to the first gear member, the wobbling planetary gear including a locking plate with at least two guiding holes that each receive a respective cylindrical pin mounted to a housing of the gear reduction mechanism.

According to a further aspect, the wobbling planetary gear includes three guiding holes that each receive a respective cylindrical pin mounted to the housing of the gear reduction mechanism.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 2A is a detailed perspective view of the output pinion-sector gear with conical involute teeth using exclusively power metal technology according to the principles of the present disclosure;

FIG. 2B is a perspective exploded view of the double output pinion gear with conical involute teeth manufactured using exclusively powder metal technology;

FIG. 3A is a perspective view of the pinion gear with conical involute teeth according to the principles of the present disclosure;

FIG. 3B is a plan view of the pinion gear with conical involute teeth according to the principles of the present disclosure;

FIG. 4 is a plan view of the sector gear with conical involute teeth according to the principles of the present disclosure;

FIG. 12 is an end plan view of the pinion-idler gear-rack drive system with conical involute teeth according to the principles of the present disclosure;

FIG. 13 is side plan section view of the gear-rack drive system with conical involute teeth according to the principles of the present disclosure;

FIG. 19 is a perspective view of the pinion gear and internal swivel ring with conical involute teeth according to the principles of the present disclosure;

FIG. 20A is an exploded perspective view of a planetary gear system of a conical involute type for driving a pinion-sector gear drive mechanism for a height or/tilt adjustable vehicle seat;

FIG. 20B is a plan view of a planetary gear system of a conical involute type for driving a pinion-sector gear drive mechanism for a height or/tilt adjustable vehicle seat.

Corresponding reference numerals indicate corresponding parts throughout the several views of the drawings.

DETAILED DESCRIPTION

Example embodiments will now be described more fully with reference to the accompanying drawings.

Figure 1:
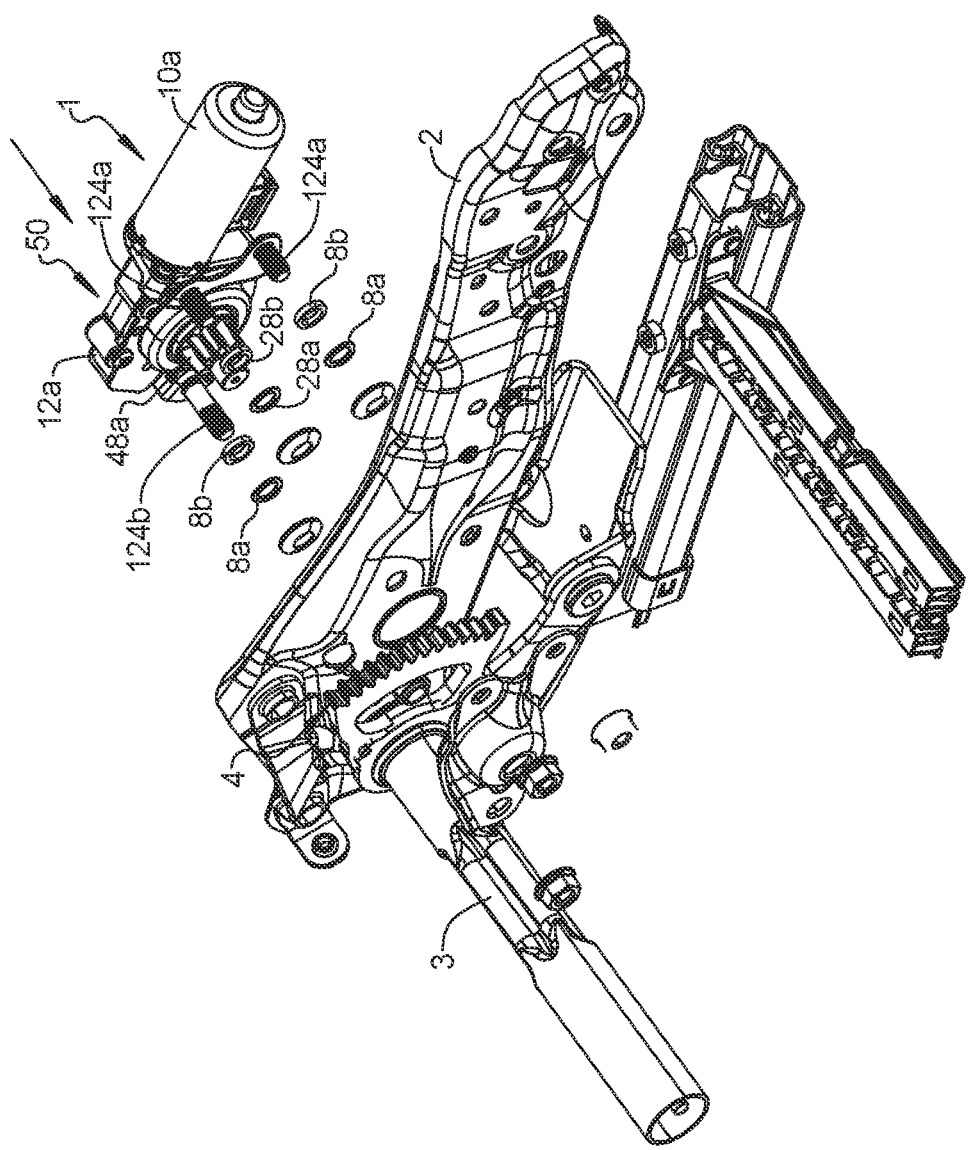
FIG. 1 is perspective exploded view of an exemplary pinion-sector gear drive mechanism for a height or/tilt adjustable vehicle seat according to the principles of the present disclosure.

With reference to FIG. 1, a seat height adjuster mechanism 1 is shown including a seat frame 2 and a seat tilt support 3 that is rotatably mounted to the seat frame 2. As is known in the art, a seat bottom cushion can be mounted to the seat frame 2 and a seat back frame with a seat back cushion can be mounted to the seat frame 2. A sector gear 4 is fixedly mounted to the seat tilt support 3. With reference to FIGS. 2A-2D, the sector gear 4 has an internally splined opening 5 for engaging external splines created on the seat tilt support 3 using a swaging process which will create a ridge-lock connection. Rotation of the seat tilt support 3 rigid connected to the sector gear 4, causes a portion of the seat frame 2 to raise or lower due to existence of car seat linkages mechanism. A pinion gear 48a is rotatably driven by a motor 10a which is drivingly connected to the pinion gear 48a by a transmission mechanism 50a (described in detail herein) that includes a housing 12. The housing 12 can be mounted to the seat frame 2 by a plurality of bolts 124a, 124b that each receive resilient washers 8a, 8b that can include one or both of wave spring washers 8a and/or elastic washers 8b that allow for axial adjustment of the pinion gear 48a relative to the sector gear 4. The transmission mechanism 50a between the motor 10a and the pinion gear 48a can be by a first-stage gear transmission as a worm and helical gear, a worm and a face gear or other known drive connections as will be described in detail herein.

Figure 2C:
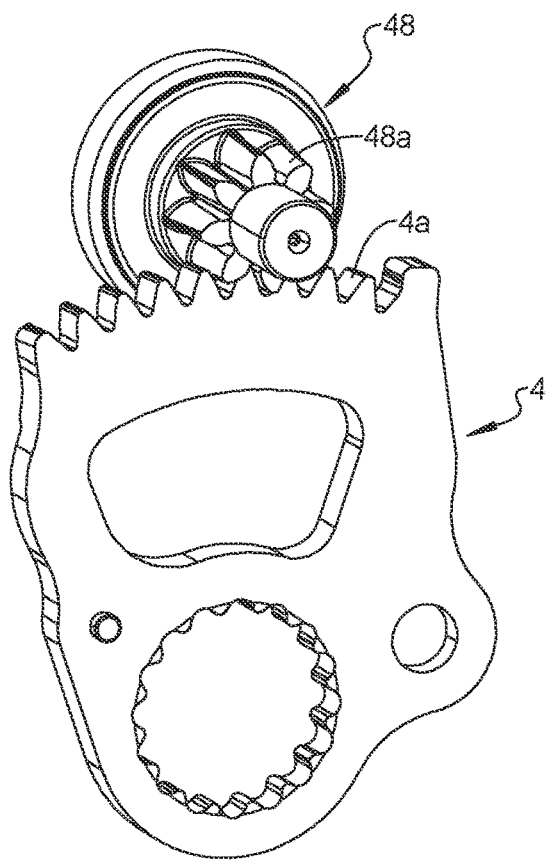
FIG. 2C is a detailed perspective view of the output pinion-sector gear with conical involute teeth using a combination of power metal technology for internal output gear and a machined hobbing technology for output pinion and sector gear according to the principles of the present disclosure.
Figure 2D:
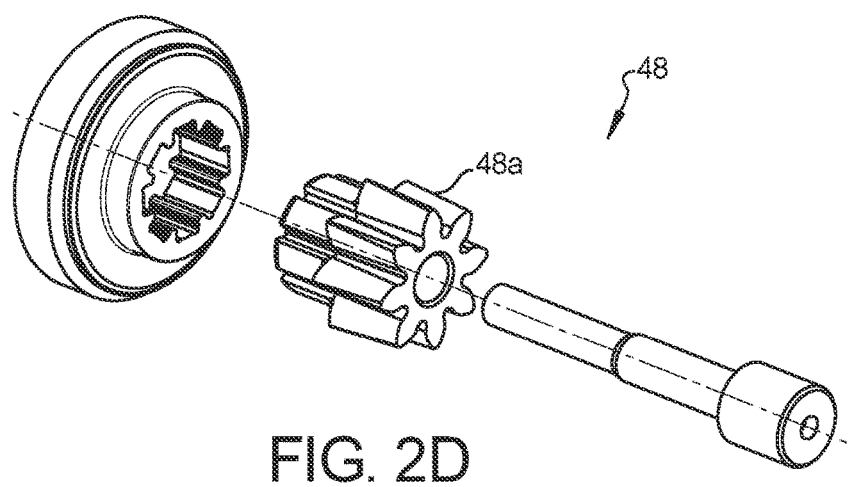
FIG. 2D is a perspective exploded view of the output pinion gear with conical involute teeth where the pinion is machined, and the internal output gear is manufactured using powder metal technology.

The pinion gear 48a is in meshing engagement with the sector gear 4. The sector gear 4 and the pinion gear 48a have parallel rotational axes and as best shown in FIGS. 2-4, each include oppositely arranged conical involute teeth 4a, 48b, respectively. The conical involute teeth have a tapered tooth thickness, a tapered root and a tapered outside diameter. The resilient washers 8a, 8b allow for axial adjustment of the pinion gear 48a relative to the sector gear 4 in order to eliminate or reduce backlash. As best shown in FIGS. 3A, 3B, the conical involute teeth 48b of the pinion gear 48a have a first diameter D1 from an axis of rotation at one axial end of the tooth that tapers outward to a larger second diameter D2 at the other axial end of the tooth. Likewise, as best shown in FIG. 4, the conical involute teeth 4a of the sector gear 4 have a first diameter d1 from an axis of rotation at one axial end of the tooth that tapers outward to a larger second diameter d2 at the other axial end of the tooth. As best shown in FIGS. 2B, 2D, the conical involute output pinion and sector gear may be manufactured using a powder metal technology (FIG. 2B) or alternatively a combination of hobbing machined and powder metal technology (FIG. 2D).

Referring now to FIG. 5A-5F, a first embodiment of the novel electric powered two-stage gear reduction mechanism, with anti-back drive capability, improved mechanical efficiency and reduced backlash gear system, is indicated generally by the reference number 150a.

An electric motor 10a, flanged to the gear reduction mechanism rigid plastic housing 12a by a set of multiple screws 14a, delivers a high-speed uniform rotational speed and a relatively low torque that are transmitted to the first-stage input gear reduction mechanism 16a, of an orthogonal-type, comprising a worm-helical gear drive, that reduces the input speed and increases the input torque.

Figure 5A:
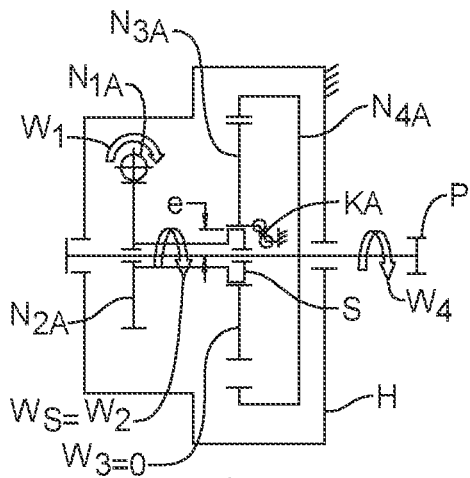
FIG. 5A is a schematic view of a first embodiment of a gear reduction mechanism with conical involute teeth according to the principles of the present disclosure.
Figure 5B:
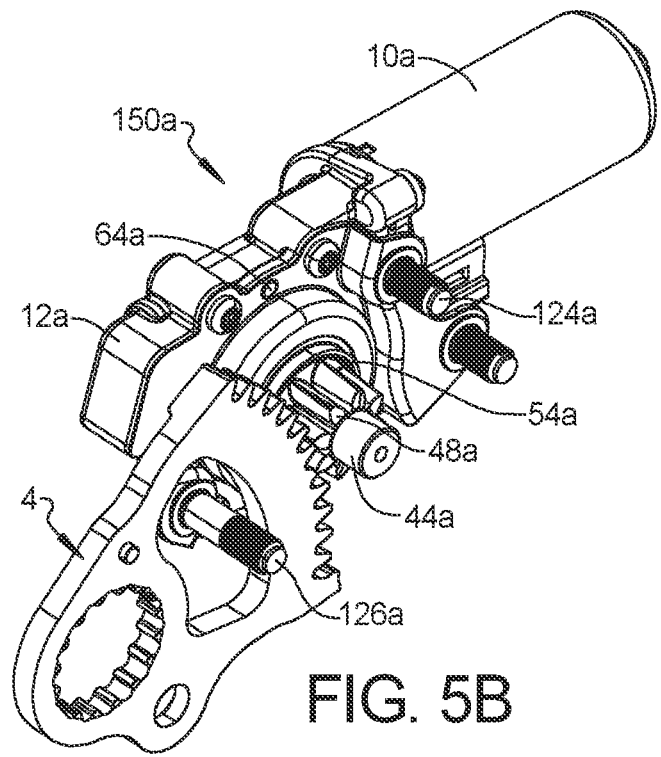
FIG. 5B is a perspective view of the first embodiment of the novel electric powered two-stage gear reduction mechanism, with anti-back drive capability, improved mechanical efficiency and reduced backlash gear system, specifically used for a vehicle seat height and/tilt position adjustment, according to the present disclosure.
Figure 5C:
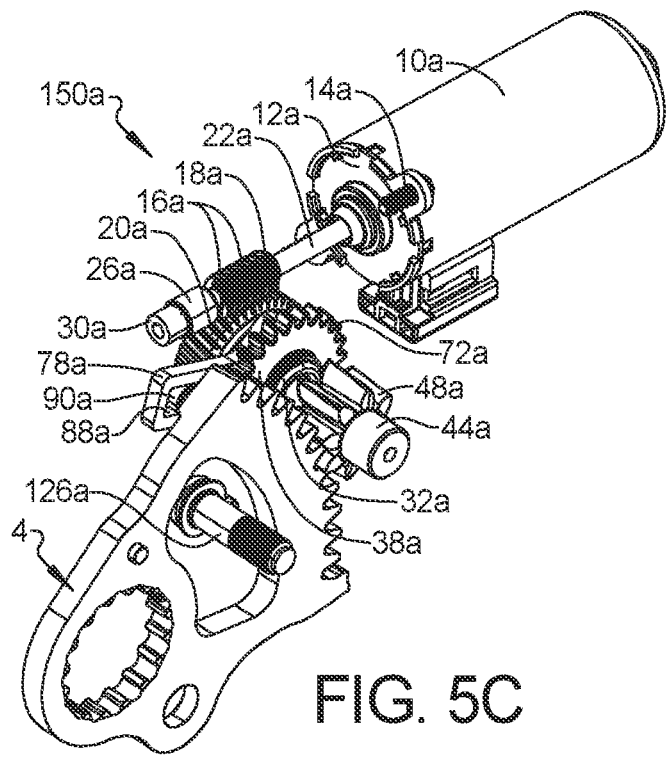
FIG. 5C is a perspective cutaway view of the first embodiment of the novel electric powered two-stage gear reduction mechanism, shown in FIG. 5B.
Figure 5D:
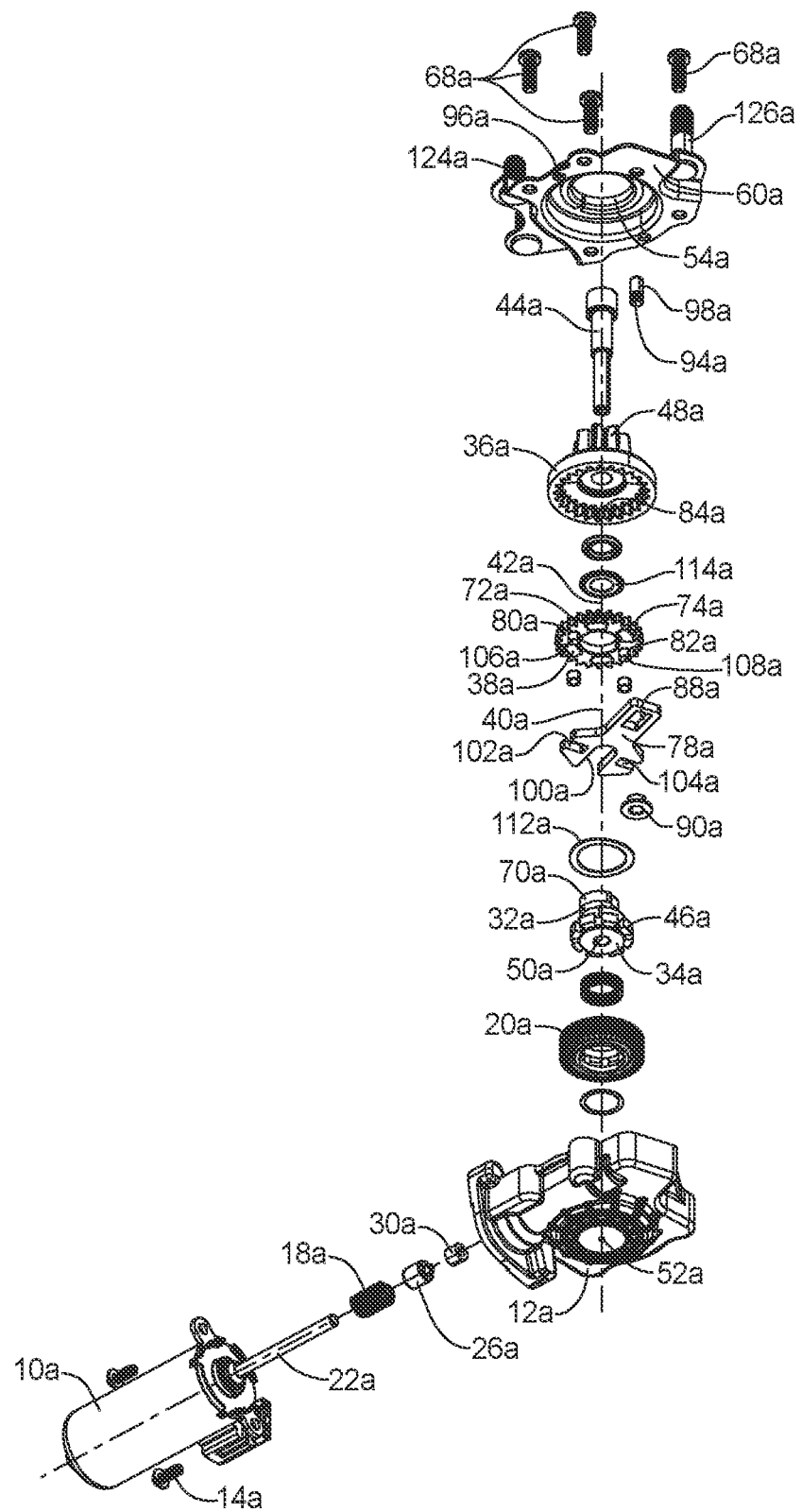
FIG. 5D is a perspective exploded view of the first embodiment of the novel electric powered two-stage gear reduction mechanism, shown in FIG. 5B.
Figure 5E:
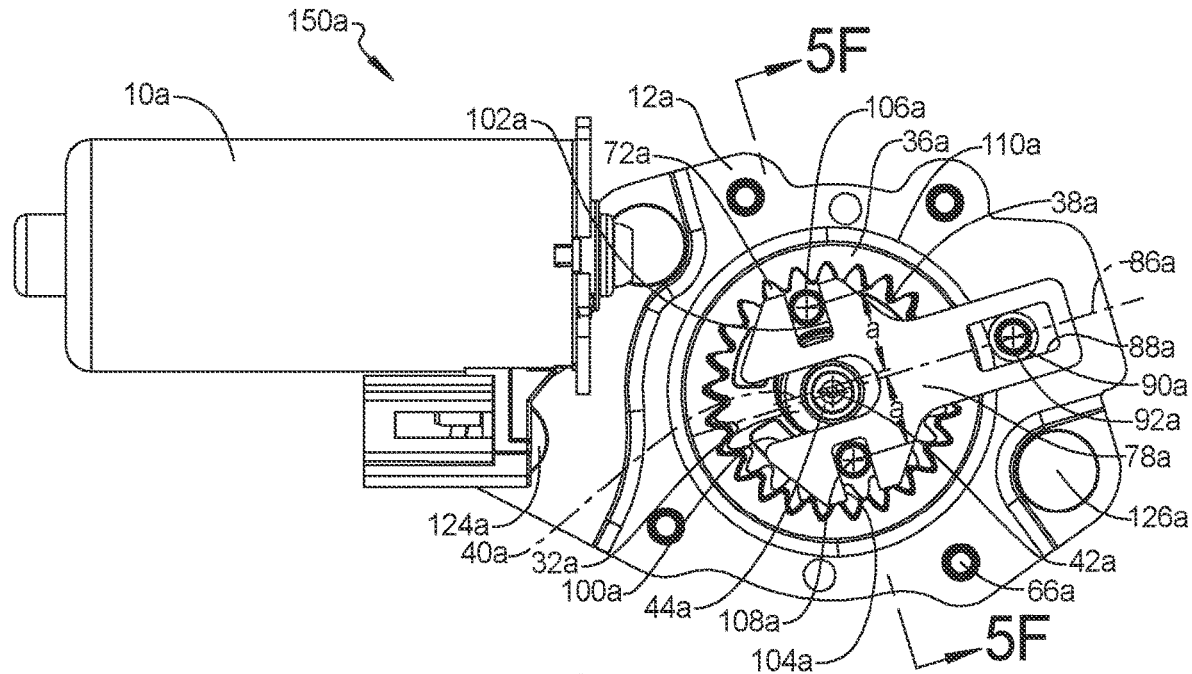
FIG. 5E is a sectional view along the line A-A, perpendicular to both, the direction of output pinion axis and the direction of wobbling gear pins axes and, parallel to the plane of movement of locking plate shown in FIG. 5D.
Figure 5F:
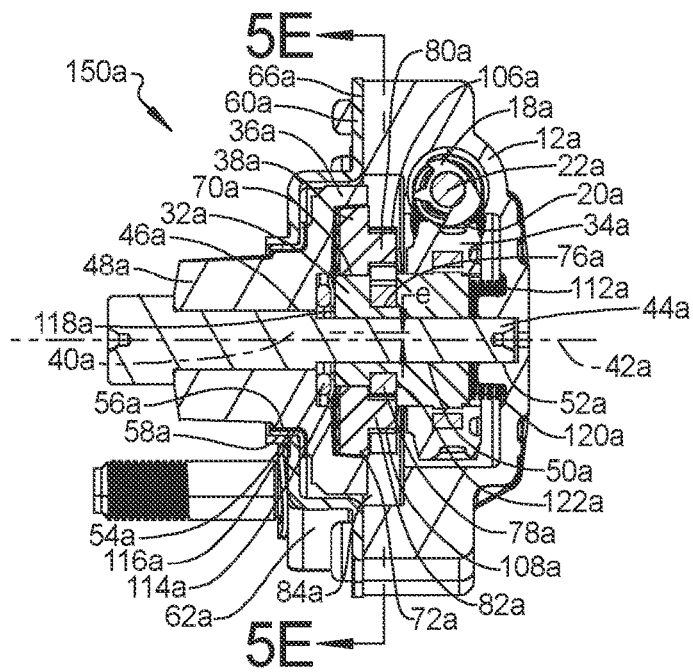
FIG. 5F is a sectional view along the line B-B, passing simultaneously through output pinion axis, wobbling gear pins axes and perpendicular to the plane of movement of locking plate shown in FIG. 5D.

The reduction ratio of the first-stage input gear reduction mechanism 16a is defined by the expression:

$$i_{12} = \frac{\omega_1}{\omega_2} = \frac{N_{2A}}{N_{1A}} \tag{1a}$$

where according to FIG. 5A, $\omega_1$, $N_{1A}$ and $\omega_2$, $N_{2A}$, with $N_{2A} > N_{1A}$ and $\omega_{2A} < \omega_1$, are the constant angular velocities and, the number of starts and teeth of the worm 18a and helical gear 20a, respectively.

The worm 18a is rigidly connected to the electric motor rotor shaft 22a at a certain distance along it by a special press fit feature, such that it properly meshes with the helical gear 20a. At the end opposing the electric motor, the rotor shaft 22a is rotatably supported into the housing aperture 24a being guided radially by a bearing bushing 26a and axially through an antifriction compound element 28a elastically supported and guided by a rubber ring stopper 30a.

Through the output member of a first-stage gear speed reduction mechanism, namely the helical gear 20a, made from a plastic material, preferably PEEK, the already reduced uniform rotational speed $\omega_2$ is transmitted to an eccentric 32a, shaped on the helical gear body 34a, that is the input element of the second-stage gear reduction mechanism with anti-back drive capability, improved mechanical efficiency and reduced backlash gear system.

The reduction ratio of the second-stage gear reduction mechanism, of a planetary-type is defined by the expression:

$$i_{s4} = \frac{\omega_s}{\omega_4} = +\frac{N_{4A}}{N_{4A} - N_{3A}} \tag{2a}$$

where according to FIG. 5A, $\omega_s$ and $\omega_4$ are the constant angular velocities of the eccentric S and planetary conical involute output internal gear 36a, respectively, while $N_{4A}$ and $N_{3A}$ are the number of teeth of the planetary conical involute output internal gear 36a and planetary eccentric external conical involute gear 38a, respectively, with $N_{4A}>N_{3A}$ and $\omega_4<\omega_s$. It should be also noted that $\omega_s=\omega_2$ and, the constant angular velocity of the planetary eccentric external gear 38a, $\omega_3=0$ due to coupling or compensating arrangement $K_A$ that uses reciprocating relative sliding movements between mechanism adjacent elements during torque transmitting operation. As such, the planetary eccentric external gear 38a will not rotate around its own axis of rotation 40a, but rather will have a wobbling circular movement around the axis of rotation 42a of the rigid shaft 44a, on which the double planetary output internal gear 36a respective pinion 48a are rigidly connected through a press-fit process or mutual spline connection. If the pinion itself is machined as shown in FIG. 2C, then the connection between the pinion 48a and the internal planetary gear 36a will be a splined connection. Ultimately the machined pinion will be press-fitted with pinion shaft 44a or a known mutual spline connection.

According to FIG. 5A, the plus sign (+) in expression (2a) shows that the eccentric S and the planetary output internal gear 36a having the number of teeth $N_{4A}$ are rotating in the same direction.

The absolute value of reduction ratio of the first embodiment of an electric powered two-stage gear reduction mechanism, specifically used for a vehicle seat height and/tilt position adjustment, with anti-back drive capability, improved mechanical efficiency and reduced backlash gear system, is defined by the expression:

$$i_{14} = \frac{\omega_1}{\omega_4} = i_{12} \cdot i_{s4} = \frac{N_{2A} \cdot N_{4A}}{N_{1A} \cdot (N_{4A} - N_{3A})} \tag{3a}$$

$$N_{4A} - N_{3A} = 1 \tag{4a}$$

then the relation (3a) becomes the expression of the maximum possible gear reduction ratio of a very compact single-stage gear reduction mechanism of the first embodiment type with anti-back drive capability, improved mechanical efficiency and reduced backlash gear system, as described by:

$$i_{14} = \frac{\omega_1}{\omega_4} = \frac{N_{2A} \cdot N_{4A}}{N_{1A}} \tag{5a}$$

The eccentric 32a, having the eccentricity value e, as well as the planetary eccentric external gear 38a, is rotatably supported through its cylindrical bore 50a on the continuous configuration axle shaft 44a, made from steel. The rigid axle shaft 44a is rotatably supported at its both ends: into the housing central bearing 52a, through its cylindrical bearing surface having its axis of rotation 42a, and into coaxially central bearing sleeve 54a through the cylindrical external bearing surface 56a of planetary output internal gear 36a. The coaxially central bearing sleeve 54a is made from a compound anti-friction material, pressed-fixed into the central aperture 58a of a stamped steel cover plate 60a, that is rigidly centered and fastened towards the housing 12a central cavity 62a by a set of guiding pins 64a injection molded on housing frontal surface 66a and a set of multiple screws 68a, respectively. The eccentric 32a of helical gear 20a, has a first bearing cylindrical surface 70a, of radius $R_s$ protruding from one of its side faces, whose axis of rotation 40a is placed at eccentricity e relative to the axis 42a of the rigid shaft 44a, on which planetary eccentric gear 38a with external teeth 72a is rotatably sliding fit mounted through its cylindrical bore 74a and which can freely rotate upon. The eccentric 32a of helical gear 20a has a second bearing surface 76a of radius $R_C$, in the form of an external cylindrical shape cutout surface coaxially placed relative to the eccentric bore surface 50a, on which a fork-like locking plate 78a is sliding supported and guided. The eccentric 32a may have also metal inserts as cylindrical bearing surfaces 70a and 76a to avoid the wear during operation. Planetary eccentric external gear 38a, made using powder metal technology is provided with two protruding pins 80a and 82a, of radii $R_p$ rigidly connected to one of its blank side faces and positioned symmetrically at a distance±a relative to its axis 40a, executes a wobbling motion such that its external teeth 72a are meshing with the internal teeth 84a of planetary output gear 36a having a cup shape form, during their entire engagement gears 38a and 36a having their pitch circles radii $R_{3A}$ and $R_{4A}$ defined by the relations:

$$\begin{cases} R_{3A} = \frac{e \cdot N_{3A}}{N_{4A} - N_{3A}} \\ R_{4A} = \frac{e \cdot N_{4A}}{N_{4A} - N_{3A}} \end{cases} \tag{6a}$$

where $R_{3A} < R_{4A}$.

The locking plate 78a made from steel by stamping, can only reciprocate with a linear frequency $L_k$ given by the sinusoidal law:

$$L_k = e \cdot \sin(\omega_s \cdot t) \tag{7a}$$

where $\omega_s = \omega_2$ is the constant angular rotational speed of the eccentric S.

The locking plate 78a is reciprocating along its axis of symmetry 86a, being supported and slidingly guided as follows: through its closed rectangular-shape sliding slot cutout 88a by the bearing cylindrical surface of a roller 90a of radius $R_k$, rotatably supported on the cylindrical surface of a metal pin 92a, rigidly fixed into the housing at its end 94a and into the cover plate hole 96a at its other end 98a, and through its U-shape sliding slot cutout 100a, by the eccentric 32a rotatable bearing cylindrical surface cutout 76a of radius $R_c$. The locking plate 78a, is also provided with two symmetrically opposite U-shape sliding slot cutouts 102a and 104a oriented in a direction perpendicular to the direction of its closed rectangular-shape sliding cutout 88a, which serve as guidance for the rollers 106a and 108a, rotatably supported by planetary eccentric external gear 38a, pins 80a and 82a, respectively, during its wobbling motion on its circular path. In this advantageous embodiment the rollers 90a, 106a and 108a are made from a self-lubricated plastic material or from a plastic material resistant to high temperature such as PEEK, for reducing the friction, wear and noise in operation and can freely rotate on supporting pins.

The locking plate 78a reciprocating translational motion into the housing cavity 62a is synchronized with the translational guided motion of planetary eccentric external gear 38a, pins and rollers along locking plate symmetrically opposite U-shape sliding slot cutouts 102a and 104a. The wobbling motion of gear 38a, relative to the housing 12a central cavity 110a is in fact a circular path plane-parallel motion, free of rotation about its own axis of rotation 40a, realized by its decomposition along two perpendicular directions, which correspond to the two directions, 86a and one perpendicular on it passing through center of two pins 80a and 82a of the locking plate 78a slot cutouts. During wobbling motion of gear 38a its external teeth 72a are meshing with internal teeth 84a of planetary output gear 36a forcing it and subsequently the output pinion 48a, rigidly connected to it, to rotate with a uniform rotational speed $\omega_4$, about its axis of rotation 42a, in the same direction of rotation as the direction of rotation of the eccentric 32a.

Thus, for the first embodiment of this novel electric powered two-stage gear reduction mechanism, with anti-back drive capability, improved mechanical efficiency and reduced backlash gear system, a precisely uniform high gear ratio transmission is possible, from input driving element, namely the worm 18a, to the driven element, namely the output pinion 48a, the absolute value of gear ratio being defined by the relations (3a) or (5a). In order to properly align axially the second-stage gear reduction mechanism subassembly within the housing 12a, relatively to the first-stage gear reduction mechanism subassembly, a steel spring washer element 112a is provided in tension against the housing inner wall. Likewise, towards the opposite end, the second-stage gear reduction mechanism subassembly is axially aligned by a metal washer cup 114a supported by a rubber ring 116a. As an X-Y shifter, the locking plate 78a is disposed in the housing 12a, in adjacent parallel relationship to the driving and driven planetary gears 38a and 36a.

Any attempt of the planetary output internal gear 36a to drive back the planetary eccentric external gear 38a in an opposite direction, due to a possible sudden change in direction of the output pinion 48a external torque load, resulting for example from an unfortunate accident, is prevented through the reaction moment created by the contact forces of locking plate 78a with the roller 90a relative to the center of locking plate 78a, due to the fact that by design the locking plate 78a can only reciprocate along the direction 86a, being double guided by both, the rotatable roller 90a cylindrical bearing surface of radius $R_k$, as well as by the eccentric 32a rotatable cylindrical bearing surface 76a of radius $R_s$. The locking plate 78a center is defined at intersection of axes of symmetry of its reciprocally perpendicular sliding slots. Therefore, the planetary output internal gear 36a cannot back drive the planetary eccentric external gear 38a, and accordingly, the helical gear 20a and implicitly the worm 18a rigidly connected to the electric motor rotor shaft 22a, around its axis of rotation, the wobbling planetary eccentric external gear 38a, being held on its eccentric path relative to the eccentric axis of rotation 42a through the engagement of its external teeth 74a with the internal teeth 84a of planetary output gear 36a. The pins 80a and 82a rigidly connected to the wobbling planetary eccentric external gear 38a, and subsequently the rotatable rollers 106a and 108a can only slide with a minimal play along the U-shape sliding slots 102a and 104a, in a direction perpendicular to the locking plate 78a longitudinal axis of symmetry 86a, the reciprocating motion having the amplitude value equal to double of eccentricity e. The locking plate 78a specific shape allows not only for a reliable support in absorbing the shock loads but also for assuring a minimum weight. Finally, it should be appreciated that this embodiment 150a, of current disclosure will prevent both: reverse rotation of the electric motor shaft that drive the actuator thereby protecting it from damage, as well as the rotation of the pinion 48a, thereby preventing a loss of current height or tilt position of a vehicle seat in which the actuator is incorporated.

All the above formulated considerations are also valid for the case in which the electric motor shaft 22a is rotating initially in an opposite direction. It could be emphasized that the teeth 72a and 84a can have a conical involute profile. It could also be mentioned that an alternative simplified design of this embodiment could have all locking plate sliding slots cutouts covered by self-lubricated snap-in plastic sleeves, while all the steel pins that slide along these guiding slots are used without rollers.

Significant friction losses are present in sliding contacts between the components that contribute to the mechanism anti-back drive capability. Replacing all surface-to-surface sliding contacts, between the adjacent moving components of the second-stage gear reduction mechanism by theoretical line-to-line rolling contacts and using grease as lubricant, will increase the mechanical efficiency of this embodiment by an estimated (7-15)% percent. Moreover, in order to further reduce the friction in operation, the helical gear body 34a has special recess features 118a, 120a and 122a, such that total estimated efficiency of this first embodiment of the novel electric powered two-stage gear reduction mechanism, with anti-back drive capability, improved mechanical efficiency and reduced backlash gear system is rated in the range of (30-35)%.

In order to attach this first embodiment of the novel electric powered two-stage gear reduction mechanism, to a vehicle seat structure, for seat height and/or tilt position adjustment, for a specific architecture, a set of multiple studs 124a and 126a fixed within cover plate 60a are considered appropriately.

Referring now to FIG. 6A-6F, a second embodiment of the novel electric powered two-stage gear reduction mechanism, with anti-back drive capability improved mechanical efficiency and reduced backlash gear system, is indicated generally by the reference number 150b.

An electric motor 10b, flanged to the gear reduction mechanism rigid plastic housing 12b by a set of multiple screws 14b, delivers a high-speed uniform rotational speed and a relatively low torque that are transmitted to the first-stage input gear reduction mechanism 16b, of an orthogonal-type, comprising a worm-face gear drive, that reduces the input speed and increases the input torque.

Figure 6A:
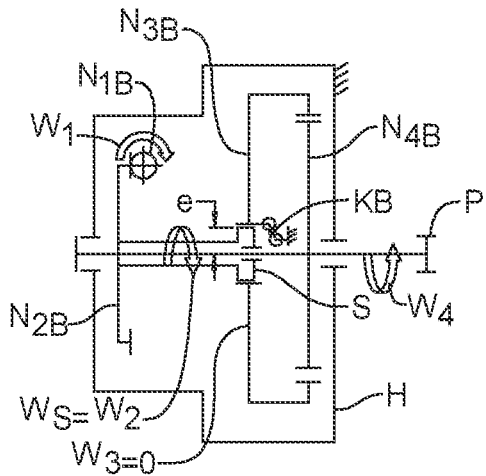
FIG. 6A is a schematic view of a second embodiment of a gear reduction mechanism with conical involute teeth according to the principles of the present disclosure.
Figure 6B:
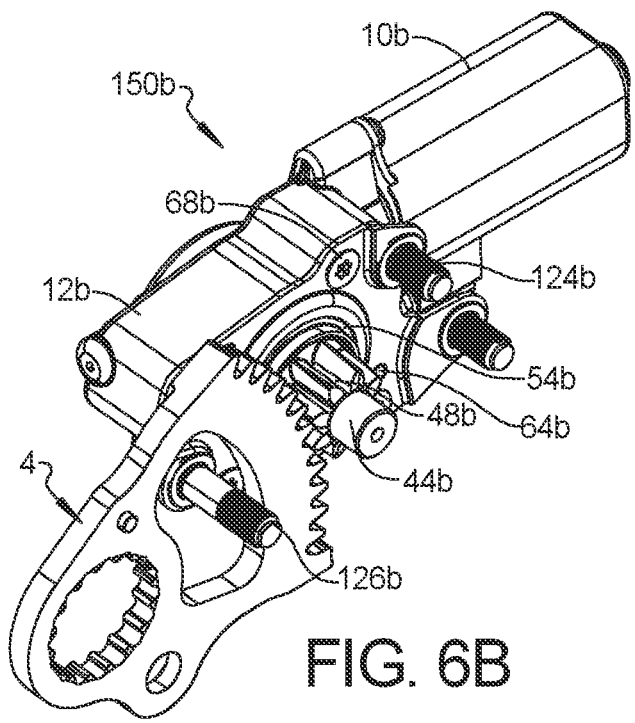
FIG. 6B is a perspective view of the second embodiment of the novel electric powered two-stage gear reduction mechanism, with anti-back drive capability, improved mechanical efficiency and reduced backlash gear system, specifically used for a vehicle seat height and/tilt position adjustment, according to the present disclosure.
Figure 6C:
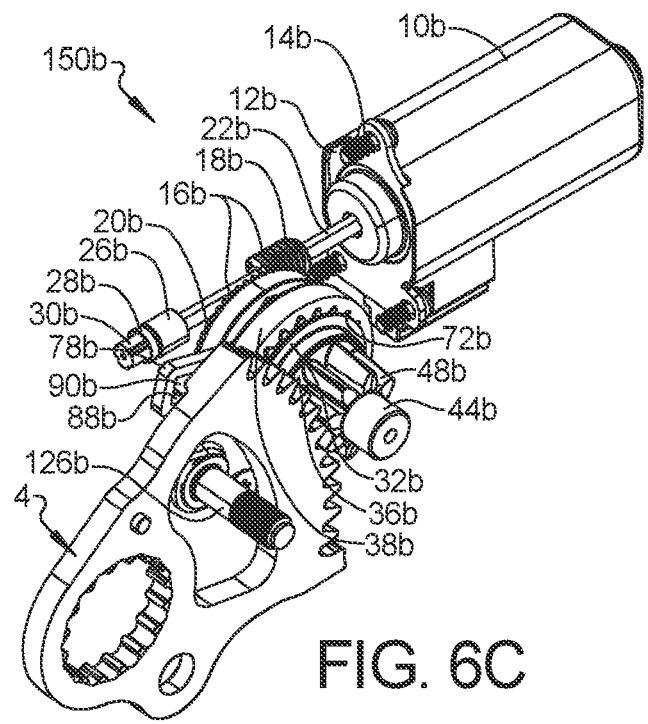
FIG. 6C is a perspective cutaway view of the second embodiment of the novel electric powered two-stage gear reduction mechanism, shown in FIG. 6B.
Figure 6D:
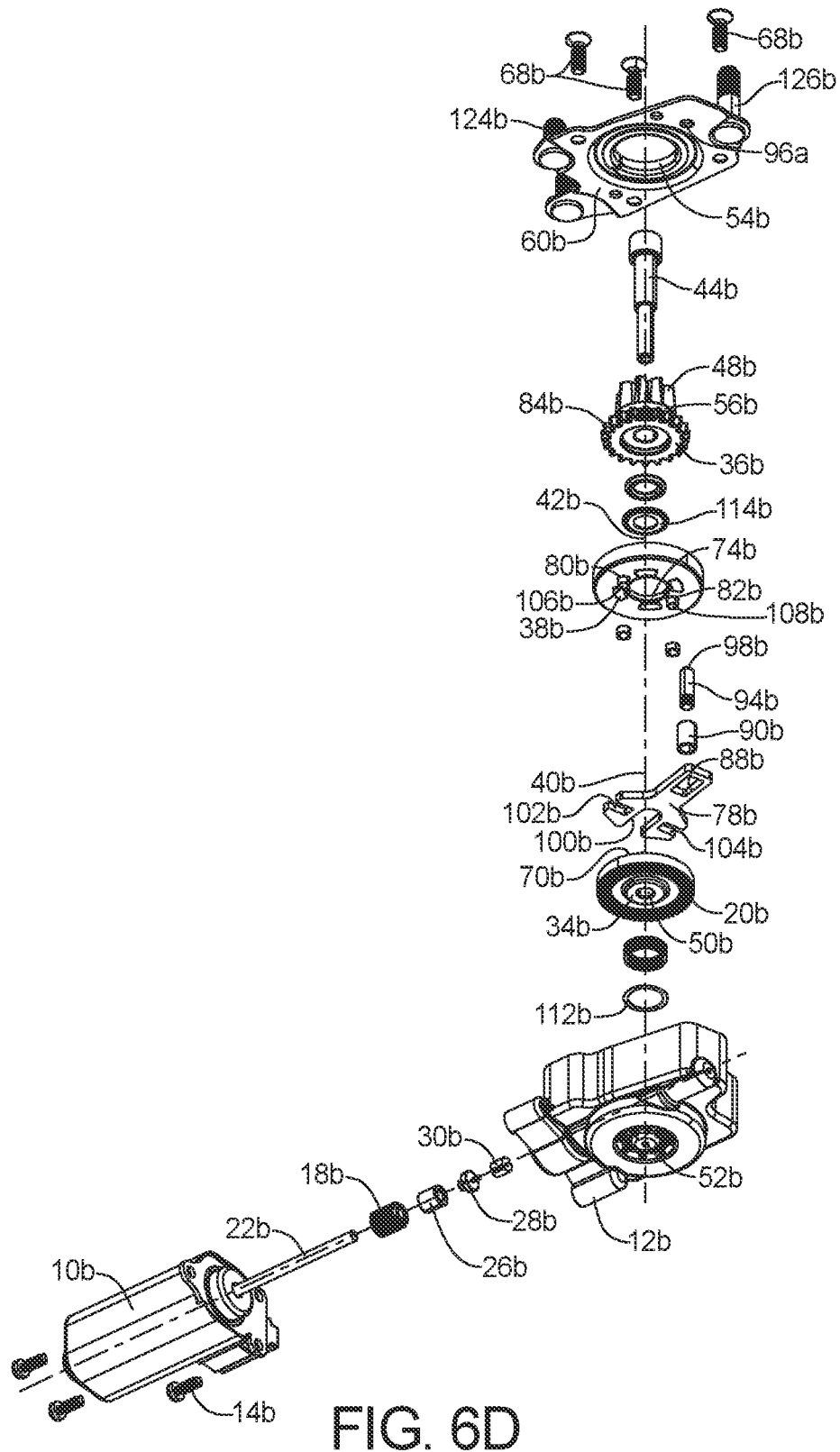
FIG. 6D is a perspective exploded view of the second embodiment of the novel electric powered two-stage gear reduction mechanism, shown in FIG. 6B.
Figure 6E:
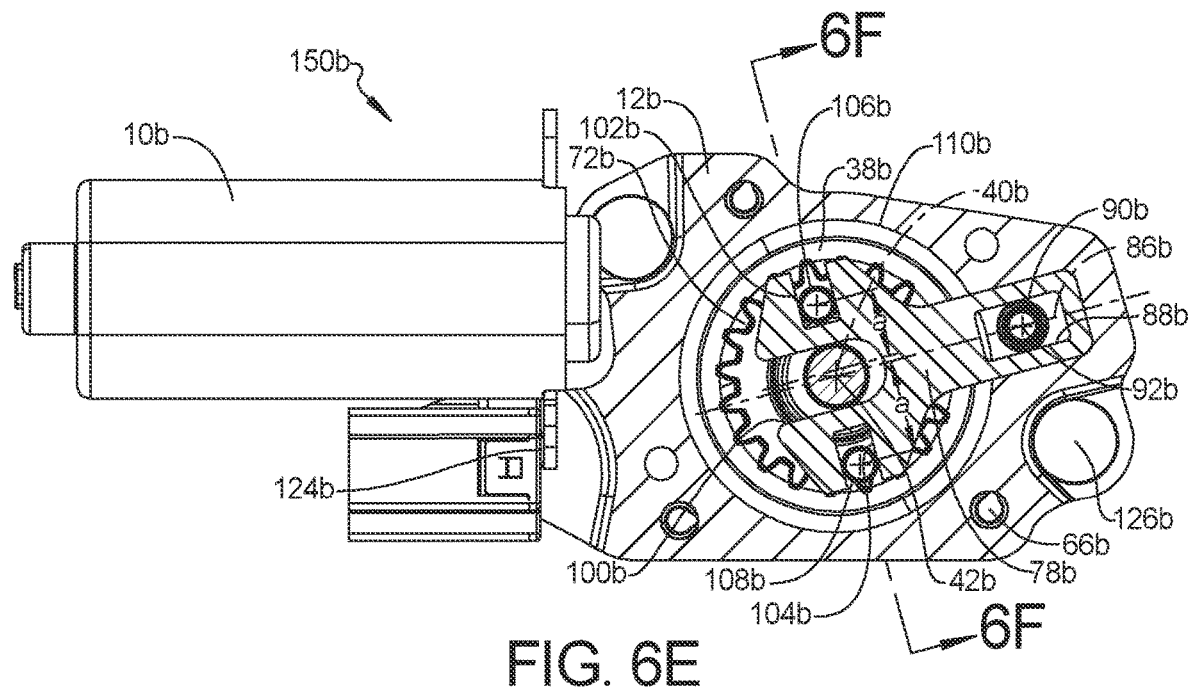
FIG. 6E is a sectional view along the line A-A, perpendicular to both, the direction of output pinion axis and the direction of wobbling gear pins axes and, parallel to the plane of movement of locking plate shown in FIG. 6F.
Figure 6F:
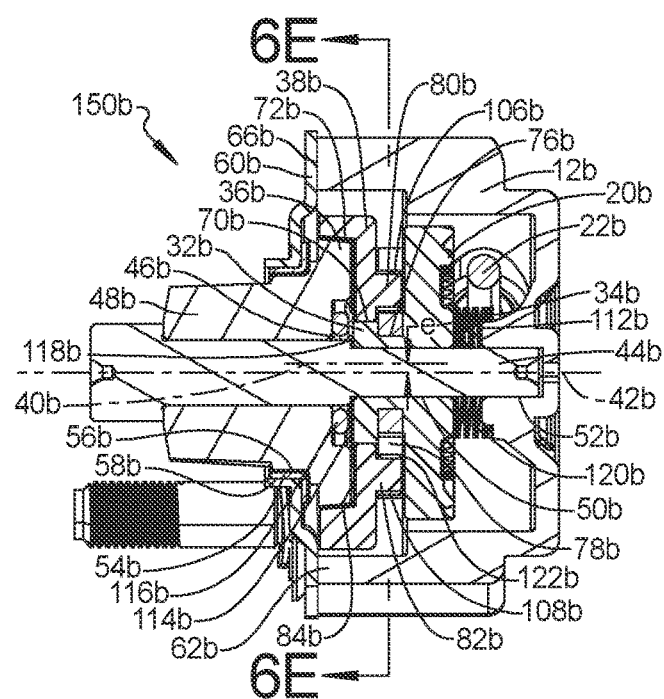
FIG. 6F is a sectional view along the line B-B, passing simultaneously through output pinion axis, wobbling gear pins axes and perpendicular to the plane of movement of locking plate shown in FIG. 6D.

The reduction ratio of the first-stage input gear reduction mechanism 16b is defined by expression:

$$i_{12} = \frac{\omega_1}{\omega_2} = \frac{N_{2B}}{N_{1B}} \tag{1b}$$

where according to FIG. 6A, $\omega_1$, $N_{1B}$ and $\omega_2$, $N_{2B}$, with $N_{2B} > N_{1B}$ and $\omega_2 < \omega_1$, are the constant angular velocities and, the number of starts and teeth of the worm 18b and face gear 20b, respectively.

The worm 18b is rigidly connected to the electric motor rotor shaft 22b at a certain distance along it by a special press fit feature, such that properly meshes the face gear 20b. At the end opposing the electric motor, the rotor shaft 22b is rotatably supported into the housing aperture 24b being guided radially by a bearing bushing 26b and axially through an antifriction compound element 28b elastically supported and guided by a rubber ring stopper 30b.

Through the output member of a first-stage gear speed reduction mechanism, namely the face gear 20b, made from a plastic material, preferably PEEK, the already reduced uniform rotational speed $\omega_2$, is transmitted to an eccentric 32b, shaped on the face gear body 34b, that is the input element of the second-stage gear reduction mechanism with anti-back drive capability, improved mechanical efficiency and reduced backlash gear system.

The reduction ratio of the second-stage gear reduction mechanism, of a planetary-type is defined by the expression:

$$i_{s4} = \frac{\omega_s}{\omega_4} = -\frac{N_{4B}}{N_{3B} - N_{4B}} \tag{2b}$$

where according to FIG. 6A, $\omega_s$ and $\omega_4$ are the constant angular velocities of the eccentric S and planetary conical involute output external gear 36b, respectively, while $N_{4B}$ and $N_{3B}$ are the number of teeth of the planetary output external conical involute gear 36b and planetary eccentric internal conical involute gear 38b, respectively, with $N_{3B} > N_{4B}$ and $\omega_4 < \omega_s$. It should be also noted that $\omega_s = \omega_2$ and, the constant angular velocity of the planetary eccentric internal gear 38b, $\omega_3 = 0$ due to coupling or compensating arrangement $K_B$ that uses reciprocating relative sliding movements between mechanism adjacent elements during torque transmitting operation. As such, the planetary eccentric internal gear 38b will not rotate around its own axis of rotation 40b, but rather will have a wobbling circular movement around the axis of rotation 42b of the rigid shaft 44b, on which the planetary output external gear 36b is rigidly fixed through a press-fit arrangement 46b. The output pinion 48b is rigidly connected to the planetary output external gear 36b.

According to FIG. 6A, the minus sign (−) in expression (2b) shows that the eccentric S and the planetary output external gear 36b having the number of teeth $N_{4B}$ are rotating in opposite directions.

The absolute value of reduction ratio of the second embodiment of an electric powered two-stage gear reduction mechanism, specifically used for a vehicle seat height and/tilt position adjustment, with anti-back drive capability, improved mechanical efficiency and reduced backlash gear system, is defined by the expression:

$$i_{14} = \frac{\omega_1}{\omega_4} = i_{12} \cdot i_{s4} = \frac{N_{2B} \cdot N_{4B}}{N_{1B} \cdot (N_{3B} - N_{4B})} \tag{3b}$$

For a given eccentricity e, if the difference between the number of teeth $N_{4B}$ and $N_{3B}$ of the planetary output external gear 36b and planetary eccentric internal gear 38b, is chosen such that:

$$N_{3B} - N_{4B} = 1 \tag{4b}$$

then the relation (3b) becomes the expression of the maximum possible gear reduction ratio of a very compact single-stage gear reduction mechanism of the second embodiment type with anti-back drive capability, improved mechanical efficiency and reduced backlash gear system, as described by:

$$i_{14} = \frac{\omega_1}{\omega_4} = \frac{N_{2B} \cdot N_{4B}}{N_{1B}} \tag{5b}$$

The eccentric 32b, having the eccentricity value e, as well as the planetary eccentric internal gear 38b, is rotatable supported through its cylindrical bore 50b on the continuous configuration axle shaft 44b, made from steel. The rigid axle shaft 44b is rotatable supported at its both ends: into the housing central bearing 52b, through its cylindrical bearing surface having its axis of rotation 42b, and into coaxially central bearing sleeve 54b through the cylindrical external bearing surface 56b of planetary output external gear 36b. The coaxially central bearing sleeve 54b is made from a compound anti-friction material, pressed-fixed into the central aperture 58b of a stamped steel cover plate 60b, that is rigidly centered and fastened towards the housing 12b central cavity 62b by a set of guiding pins 64b injection molded on housing frontal surface 66b and a set of multiple screws 68b, respectively. The eccentric 32b of face gear 20b, has a first bearing cylindrical surface 70b, of radius $R_s$ protruding from one of its side faces, whose axis of rotation 40b is placed at eccentricity e relative to the axis 42b of the rigid shaft 44b, on which planetary eccentric gear 38b with internal teeth 72b is rotatably sliding fit mounted through its cylindrical bore 74b and which can freely rotate upon. The eccentric 32b of face gear 20b has a second bearing surface 76b of radius $R_C$, in form of an external cylindrical shape cutout surface coaxially placed relative to the eccentric bore surface 50b, on which a fork-like locking plate 78b is sliding supported and guided. The eccentric 32b may have also metal inserts as cylindrical bearing surfaces 70b and 76b to avoid the wear during operation. Planetary eccentric internal gear 38b, having a cup shape form, made from powder metal is provided with two protruding pins 80b and 82b, of radii $R_p$ rigidly connected to one of its blank side faces and positioned symmetrically at a distance±a relative to its axis 40b, executes a wobbling motion such that its internal teeth 72b are meshing with the external teeth 84b of planetary output gear 36b, during their entire engagement gears 38b and 36b having their pitch circles radii $R_{3B}$ and $R_{4B}$ defined by the relations:

$$\begin{cases} R_{3B} = \dfrac{e \cdot N_{3B}}{N_{3B} - N_{4B}} \\ R_{4B} = \dfrac{e \cdot N_{4B}}{N_{3B} - N_{4B}} \end{cases} \tag{6b}$$

where $R_{4B} < R_{3B}$.

The locking plate 78b made from steel by stamping, can only reciprocate with a linear frequency $L_k$ given by the sinusoidal law:

$$L_k = e \cdot \sin(\omega_s \cdot t) \tag{7b}$$

where $\omega_s = \omega_2$ is the constant angular rotational speed of the eccentric S.

The locking plate 78b is reciprocating along its axis of symmetry 86b, being supported and sliding guided as follows: through its closed rectangular-shape sliding slot cutout 88b by the bearing cylindrical surface of a roller 90b of radius $R_k$, rotatable supported on the cylindrical surface of a metal pin 92b, rigidly fixed into the housing at its end 94b and into the cover plate hole 96b at its other end 98b, and through its U-shape sliding slot cutout 100b, by the eccentric 32b rotatable bearing cylindrical surface cutout 76b of radius $R_c$. The locking plate 78b, is also provided with two symmetrically opposite U-shape sliding slots cutouts 102b and 104b oriented in a direction perpendicular to the direction of its closed rectangular-shape sliding cutout 88b, which serve as guidance for the rollers 106b and 108b, rotatable supported by planetary eccentric internal gear 38b, pins 80b and 82b, respectively, during its wobbling motion on its circular path. In this advantageous embodiment the rollers 90b, 106b and 108b are made from a self-lubricated plastic material or from a plastic material resistant to high temperature as PEEK, for reducing the friction, wear and noise in operation and can freely rotate on supporting pins.

The locking plate 78*b* reciprocating translational motion into the housing cavity 62*b* is synchronized with the translational guided motion of planetary eccentric internal gear 38*b*, pins and rollers along locking plate symmetrically opposite U-shape sliding slots cutouts 102*b* and 104*b*. The wobbling motion of gear 38*b*, relative to the housing 12*b* central cavity 110*b* is in fact a circular path plane-parallel motion, free of rotation about its own axis of rotation 40*b*, realized by its decomposition along two perpendicular directions, which correspond to the two directions, 86*b* and one perpendicular on it passing through center of two pins 80*b* and 82*b* of the locking plate 78*b* slots cutouts. During wobbling motion of gear 38*b* its internal teeth 72*b* are meshing with external teeth 84*b* of planetary output gear 36*b* forcing it and subsequently the output pinion 48*b*, rigidly connected to it, to rotate with a uniform rotational speed $\omega_4$, about its axis of rotation 42*b*, in an opposite direction of rotation as the direction of rotation of the eccentric 32*b*.

Thus, for the second embodiment of this novel electric powered two-stage gear reduction mechanism, with anti-back drive capability, improved mechanical efficiency and reduced backlash gear system, a precisely uniform high gear ratio transmission is possible, from input driving element, namely the worm 18*b*, to the driven element, namely the output pinion 48*b*, the absolute value of gear ratio being defined by the relations (3b) or (5b). In order to properly align axially the second-stage gear reduction mechanism subassembly within the housing 12*b*, relatively to the first-stage gear reduction mechanism subassembly, a steel spring washer element 112*b* is provided in tension against the housing inner wall. Likewise, towards the opposite end, the second-stage gear reduction mechanism subassembly is axially aligned by a metal washer cup 114*b* supported by a rubber ring 116*b*. As an X-Y shifter, the locking plate 78*b* is disposed in the housing 12*b*, in adjacent parallel relationship to the driving and driven planetary gears 38*b* and 36*b*.

Any attempt of the planetary output external gear 36*b* to drive back the planetary eccentric internal gear 38*b* in an opposite direction, due to a possible sudden change in direction of the output pinion 48*b* external torque load, resulting for example from an unfortunate accident, is prevented through the reaction moment created by the contact forces of locking plate 78*b* with the roller 90*b* relative to the center of locking plate 78*b*, due to the fact that by design the locking plate 78*b* can only reciprocate along the direction 86*b*, being double guided by both, the rotatable roller 90*b* cylindrical bearing surface of radius $R_k$, as well as by the eccentric 32*b* rotatable cylindrical bearing surface 76*b* of radius $R_s$. The locking plate 78*b* center is defined at intersection of axes of symmetry of its reciprocally perpendicular sliding slots. Therefore, the planetary output external gear 36*b* cannot back drive the planetary eccentric internal gear 38*b*, and accordingly, the face gear 20*b* and implicitly the worm 18*b* rigidly connected to the electric motor rotor shaft 22*b*, around its axis of rotation, the wobbling planetary eccentric gear 38*b*, being held on its eccentric path relative to the eccentric axis of rotation 42*b* through the engagement of its internal teeth 74*b* with the external teeth 84*b* of planetary output gear 36*b*. The pins 80*b* and 82*b* rigidly connected to the wobbling planetary eccentric internal gear 38*b*, and subsequently the rotatable rollers 106*b* and 108*b* can only slide with a minimal play along the U-shape sliding slots 102*b* and 104*b*, in a direction perpendicular to the locking plate 78*b* longitudinal axis of symmetry 86*b*, the reciprocating motion having the amplitude value equal to double of eccentricity e. The locking plate 78*b* specific shape allows not only for a reliably support in absorbing the shock loads but also for assuring a minimum weight. Finally, it should be appreciated that this embodiment 150*b*, of current disclosure will prevent both: reverse rotation of the electric motor shaft that drive the actuator thereby protecting it from damage, as well as the rotation of the pinion 48*b*, thereby preventing the loss of current height or tilt position of a vehicle seat in which the actuator is incorporated.

All the above formulated considerations are also valid for the case in which the electric motor shaft 22*b* is rotating initially in an opposite direction. It could be emphasized that the teeth 72*b* and 84*b* can have a conical involute profile. It could also be mentioned that an alternative simplified design of this embodiment could have all locking plate sliding slots cutouts covered by self-lubricated snap-in plastic sleeves, while all the powder metal pins that slide along these guiding slots are used without rollers.

Significant friction losses are present in sliding contacts between the components that contribute to the mechanism anti-back drive capability. Replacing all surface-to-surface sliding contacts, between the adjacent moving components of the second-stage gear reduction mechanism by theoretical line-to-line rolling contacts and using grease as lubricant, will increase the mechanical efficiency of this embodiment by an estimated (7-15)% percent. Moreover, in order to further reduce the friction in operation, the helical gear body 34*b* has special recess features 118*b*, 120*b* and 122*b*, such that total estimated efficiency of this second embodiment of the novel electric powered two-stage gear reduction mechanism, with anti-back drive capability and improved mechanical efficiency is rated in the range of (30-35)%.

In order to attach this second embodiment of the novel electric powered two-stage gear reduction mechanism, to a vehicle seat structure, for seat height and/or tilt position adjustment, for a specific architecture, a set of multiple studs 124*b* and 126*b* fixed within cover plate 60*b* are considered appropriately.

Referring now to FIGS. 7A-7H, a third embodiment of the novel electric powered two-stage gear reduction mechanism, with anti-back drive capability, improved mechanical efficiency and reduced backlash gear system, is indicated generally by the reference number 150*c*.

An electric motor 10*c*, flanged to the gear reduction mechanism rigid plastic housing 12*c* by a set of multiple screws 14*c*, delivers a high-speed uniform rotational speed and a relatively low torque that are transmitted to the first-stage input gear reduction mechanism 16*c*, of an orthogonal-type, comprising a worm-helical gear drive, that reduces the input speed and increases the input torque.

Figure 7A:
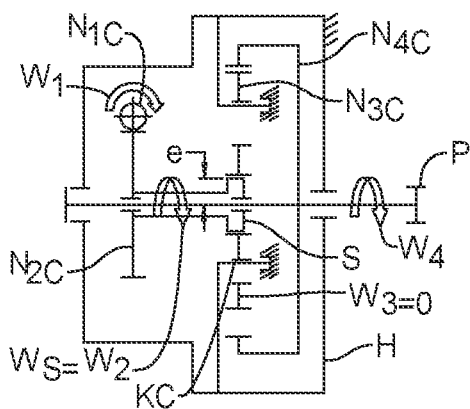
FIG. 7A is a schematic view of a third embodiment of a gear reduction mechanism with conical involute teeth according to the principles of the present disclosure.
Figure 7B:
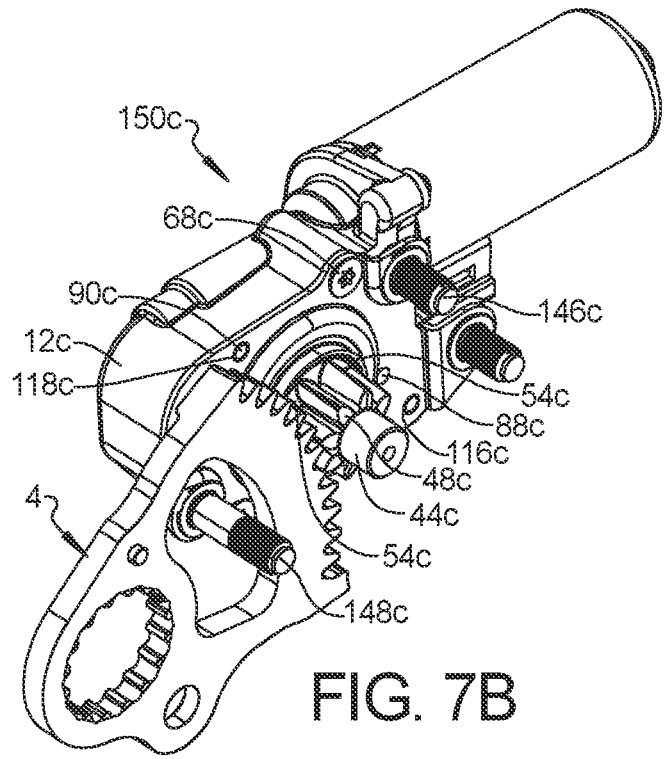
FIG. 7B is a perspective view of the third embodiment of the novel electric powered two-stage gear reduction mechanism, with anti-back drive capability and improved mechanical efficiency, specifically used for a vehicle seat height and/tilt position adjustment, according to the present disclosure.
Figure 7C:
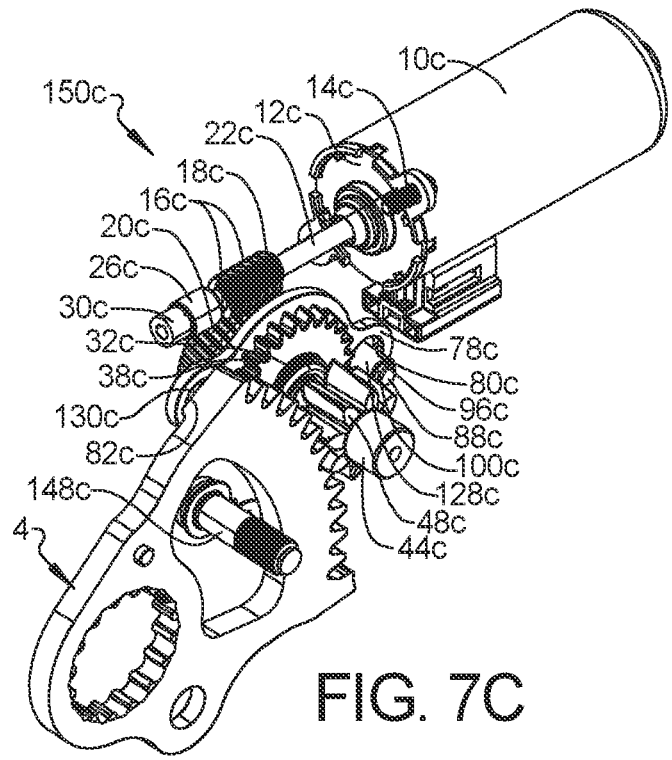
FIG. 7C is a perspective cutaway view of the third embodiment of the novel electric powered two-stage gear reduction mechanism, shown in FIG. 7B.
Figure 7D:
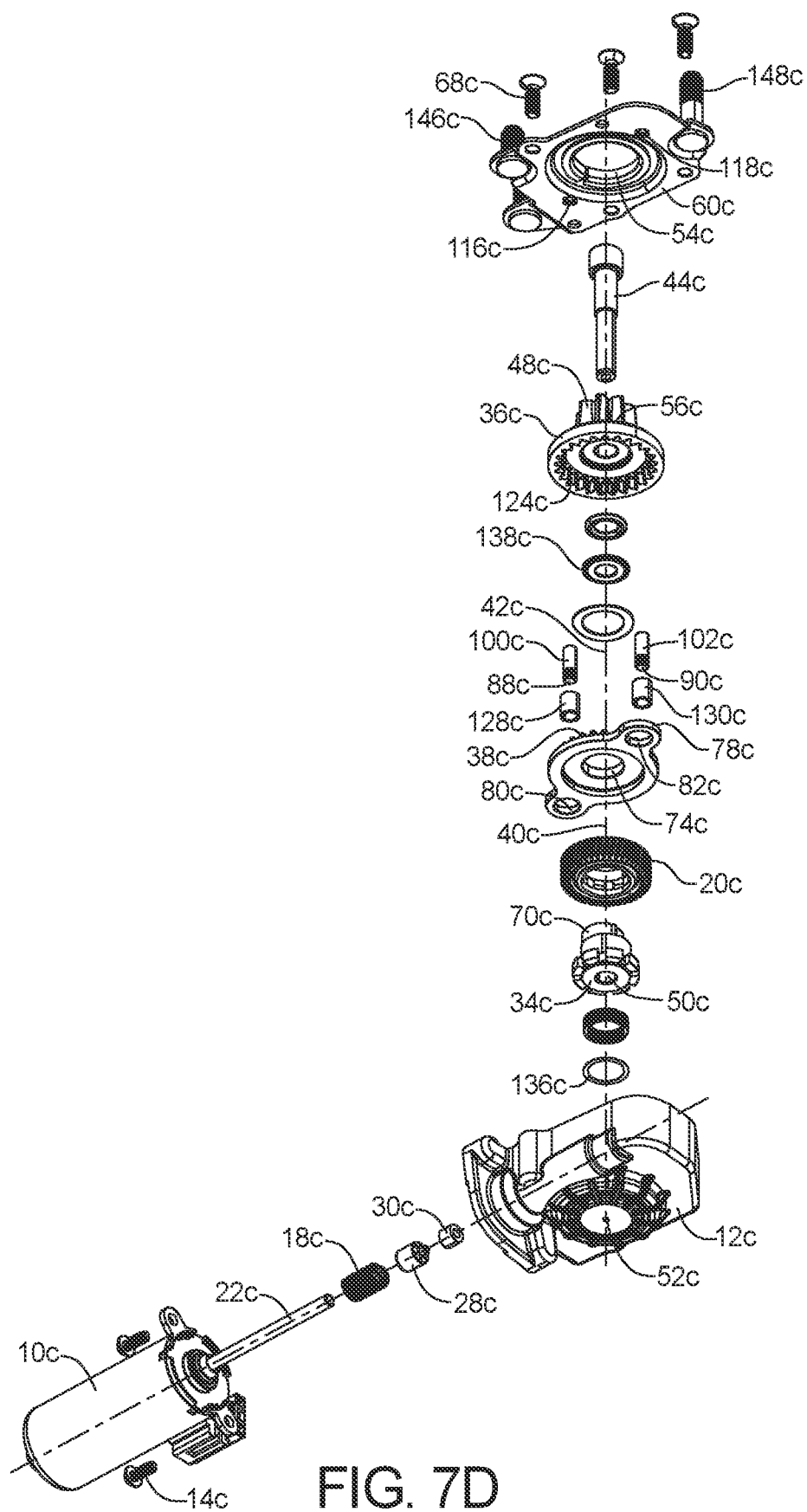
FIG. 7D is a perspective exploded view of the third embodiment of the novel electric powered two-stage gear reduction mechanism, shown in FIG. 7B.
Figure 7E:
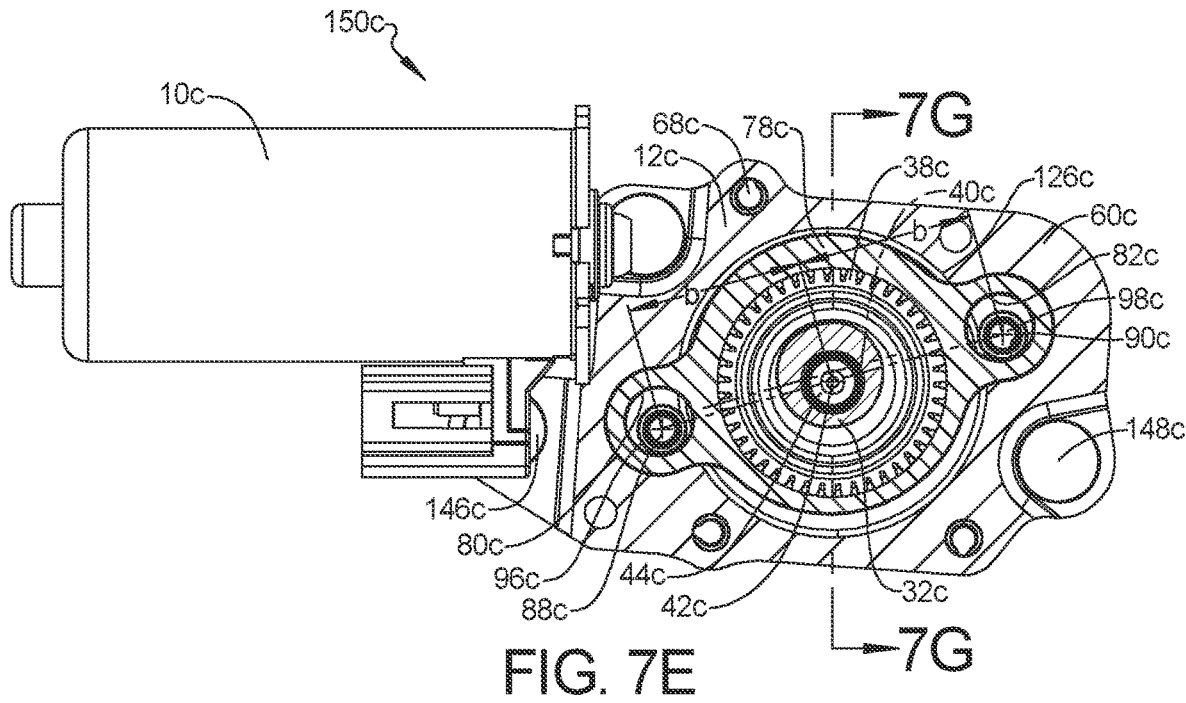
FIG. 7E is a sectional view along the line A-A, perpendicular to both, the direction of output pinion axis and the direction of fixed pins axes and, parallel to the plane of movement of two-asymmetrically pins locking plate shown in FIG. 7D.
Figure 7F:
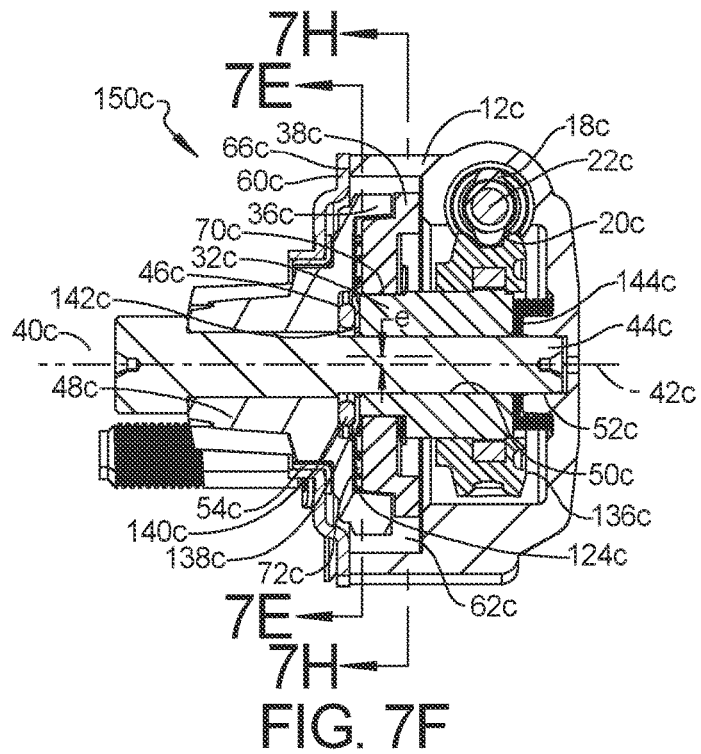
FIG. 7F is a sectional view along the line B-B, containing the output pinion axis and perpendicular to the plane of movement of two-asymmetrically pins locking plate shown in FIG. 7D.
Figure 7G:
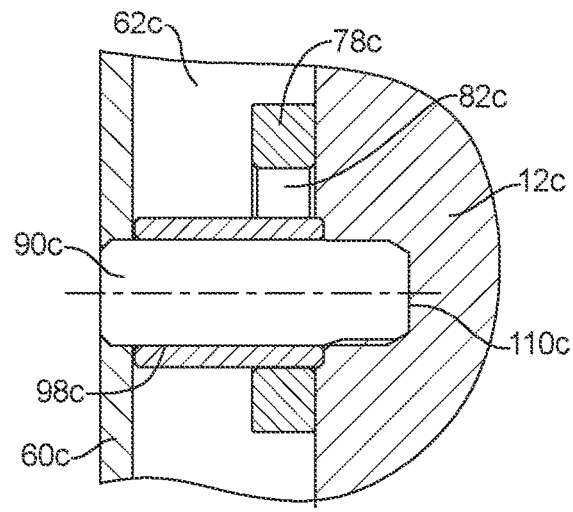
FIG. 7G is a sectional view along the line C-C, containing one of the fixed pins axis and perpendicular to the plane of movement of two-asymmetrically pins locking plate shown in FIG. 7D.
Figure 7H:
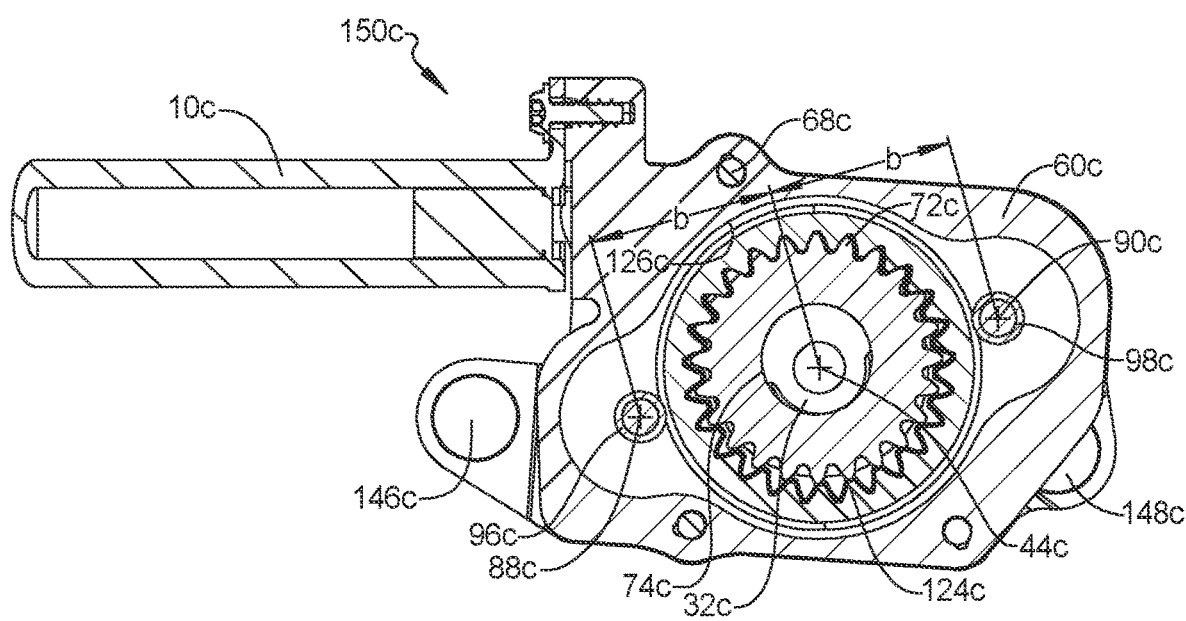
FIG. 7H is a sectional view along the line D-D, perpendicular to both, the direction of output pinion axis and the direction of fixed pins axes, and passing through the middle face width of both external and internal gears teeth in mesh, shown in FIG. 7D.

The reduction ratio of the first-stage input gear reduction mechanism 16*c* is defined by expression:

$$i_{12} = \frac{\omega_1}{\omega_2} = \frac{N_{2C}}{N_{1C}} \tag{1c}$$

where according to FIG. 7A, $\omega_1$, $N_{1C}$ and $\omega_2$, $N_{2C}$, with $N_{2C} > N_{1C}$ and $\omega_2 < \omega_1$, are the constant angular velocities and, the number of starts and teeth of the worm 18*c* and helical gear 20*c*, respectively.

The worm 18*c* is rigidly connected to the electric motor rotor shaft 22*c* at a certain distance along it by a special press fit feature, such that properly meshes the helical gear 20*c*. At the end opposing the electric motor, the rotor shaft 22*c* is rotatably supported into the housing aperture 24c being guided radially by a bearing bushing 26c and axially through an antifriction compound element 28c elastically supported and guided by a rubber ring stopper 30c.

Through the output member of a first-stage gear speed reduction mechanism, namely the helical gear 20c, made from a plastic material, preferably PEEK, the already reduced uniform rotational speed $\omega_2$ is transmitted to an eccentric 32c, shaped on the helical gear body 34c, that is the input element of the second-stage gear reduction mechanism with anti-back drive capability and improved mechanical efficiency.

The reduction ratio of the second-stage gear reduction mechanism, of a planetary-type is defined by the expression:

$$i_{s4} = \frac{\omega_s}{\omega_4} = +\frac{N_{4C}}{N_{4C} - N_{3C}} \qquad (2c)$$

where according to FIG. 7A, $\omega_s$ and $\omega_4$ are the constant angular velocities of the eccentric S and planetary output internal conical involute gear 36c, respectively, while $N_{4C}$ and $N_{3C}$ are the number of teeth of the planetary output internal conical involute gear 36c and planetary eccentric external conical involute gear 38c, respectively, with $N_{4C} > N_{3C}$ and $\omega_4 < \omega_s$. It should be also noted that $\omega_s = \omega_2$ and, the constant angular velocity of the planetary eccentric external gear 38c, $\omega_3 = 0$ due to coupling or compensating arrangement $K_C$ that uses rolling contact action between mechanism adjacent elements during torque transmitting operation. As such, the planetary eccentric external gear 38c will not rotate around its own axis of rotation 40c, but rather will have a wobbling circular movement around the axis of rotation 42c of the rigid shaft 44c, on which the planetary output internal gear 36c is rigidly fixed through a splined arrangement 46c. The output pinion 48c is rigidly connected to the rigid shaft 44c.

According to FIG. 7A, the plus sign (+) in expression (2c) shows that the eccentric S and the planetary output internal gear 36c having the number of teeth $N_{4C}$ are rotating in the same direction.

The absolute value of reduction ratio of the fifth embodiment of an electric powered two-stage gear reduction mechanism, specifically used for a vehicle seat height and/tilt position adjustment, with anti-back drive capability, improved mechanical efficiency and reduced backlash gear system, is defined by the expression:

$$i_{14} = \frac{\omega_1}{\omega_4} = i_{12} \cdot i_{s4} = \frac{N_{2C} \cdot N_{4C}}{N_{1C} \cdot (N_{4C} - N_{3C})} \qquad (3c)$$

For a given eccentricity e, if the difference between the number of teeth $N_{4C}$ and $N_{3C}$ of the output internal gear 36c and planetary eccentric external gear 38c, is chosen such that:

$$N_{4C} - N_{3C} = 1 \qquad (4c)$$

then the relation (3c) becomes the expression of the maximum possible gear reduction ratio of a very compact two-stage gear reduction mechanism of the fifth embodiment type with anti-back drive capability, improved mechanical efficiency and reduced backlash gear system, as described by:

$$i_{14} = \frac{\omega_1}{\omega_4} = \frac{N_{2C} \cdot N_{4C}}{N_{1C}} \qquad (5c)$$

The eccentric 32c, having the eccentricity value e, as well as the planetary eccentric external gear 38c, is rotatable supported through its cylindrical bore 50c on the continuous configuration axle shaft 44c, made from steel. The toothed conical involute output pinion 48c and conical involute output internal gear 36c, integrally powder metal formed type or alternatively metal and powder metal, is rigidly connected to the axel shaft 44c by a press-fit process or splined connection. The rigid axle shaft 44c is rotatable supported at its both ends: into the housing central bearing 52c, through its cylindrical bearing surface having its axis of rotation 42c, and into coaxially central bearing sleeve 54c through the cylindrical external bearing surface 56c of planetary output internal gear 36c. The coaxially central bearing sleeve 54c is made from a compound anti-friction material, pressed-fixed into the central aperture 58c of a stamped steel cover plate 60c, that is rigidly centered and fastened towards the housing 12c central cavity 62c by a set of guiding pins 64c injection molded on housing frontal surface 66c and a set of multiple screws 68c, respectively. The eccentric 32c of helical gear 20c, has a bearing cylindrical surface 70c, of radius $R_s$ protruding from one of its side faces, whose axis of rotation 40c is placed at eccentricity e relative to the axis 42c of the rigid shaft 44c, on which planetary eccentric gear 38c with external teeth 72c protruding from one of its side faces is rotatably sliding fit mounted through its cylindrical bore 74c and which can freely rotate upon. The eccentric 32c may have also metal insert as cylindrical bearing surface 70c to avoid the wear during operation.

The planetary eccentric gear 38c forms a unitary part with a locking plate 78c, provided with two cylindrical guiding holes 80c and 82c, supported and rotatably mounted on two cylindrical pins 88c and 90c, through two cylindrical rollers 96c and 98c, having their outer surfaces of radii $R_f$ and which can freely rotate upon the pins cylindrical surfaces 100c and 102c, respectively. In this advantageous embodiment the rollers pins 88c and 90c are made from steel, while the rollers 96c and 98c are made from a self-lubricated plastic material or from a plastic material resistant to high temperature as PEEK, for reducing the friction, wear and noise in operation. In order to avoid their bending during operation, the pins are fixed mounted and supported at their both ends, by a press fit into the housing blind holes 108c and 110c, as well as by a sliding fit into the cover plate 60c through holes 116c and 118c, respectively. The planar position of the two cylindrical pins axes, in an arbitrary plane perpendicular to the housing central bearing surface 52c axis 42c is defined by three parameters relative to an orthogonal coordinate system $O_F X_F Y_F Z_F$ having the $O_F Z_F$ axis direction overlapping the direction of housing central bearing axis 42c and the orthogonal to each other coordinate planes $O_F X_F Y_F$ and $O_F Y_F Z_F$ perpendicular to, respectively, containing the axis 42c. Thus, relative to the plane $O_F Y_F Z_F$ the axes of pins 88c and 90c are placed symmetrically at a distance b, while relative to the plane $O_F X_F Z_F$ the same axes are placed asymmetrically at a distance $c_1$ and $c_2$, respectively, from considerations related to radial loads and rolling contact friction reduction, e.g. mechanical efficiency improvement. The position of cylindrical guiding holes of radii ($R_f$+e) on locking plate 78c is such that when the planetary gear 38c is rotatably sliding fitted on the eccentric bearing cylindrical surface 70c through its cylindrical central bore surface 74c, then the rollers 96c and 98c will be directly positioned in the guiding holes 80c and 82c with a sliding fit between the rollers cylindrical outer surfaces, and the inner walls of locking plate guiding holes 80c and 82c, respectively. The locking plate 78c specific shape allows not only for a reliably support in absorbing the shock loads but also for a minimum weight.

The conical involute planetary eccentric gear 38c made from power metal and the locking plate 78c, made from steel executes a wobbling motion such that its external conical involute teeth 72c are meshing with the conical involute internal teeth 124c of the planetary output internal gear 36c having a cup shape form and made also from powder metal, by a sintering process. Both gears are in adjacent parallel relationship to each other, during their entire engagement gears 38c and 36c having their pitch circles radii $R_{3E}$ and $R_{4E}$ defined by the relations:

$$\begin{cases} R_{3C} = \dfrac{e \cdot N_{3C}}{N_{4C} - N_{3C}} \\ R_{4C} = \dfrac{e \cdot N_{4C}}{N_{4C} - N_{3C}} \end{cases} \quad (6c)$$

where $R_{3C} < R_{4C}$.

During the rotation of the helical gear 20c and, implicitly of eccentric 32c, in an arbitrary direction, with a uniform rotational speed $\omega_s$, the point of tangency between the gears pitch circles travels along these circles, such that the planetary external gear 38c describes a wobbling motion within housing central cavity 126c, relative to the housing central bearing surface axis of rotation 42c. In fact, this circular path plane-parallel motion of radius equal to the eccentricity e of planetary external gear 38c, free of rotation about its own axis of rotation 40c is realized using rolling contact action through a set of coupling or compensating arrangements including rollers 96c and 98c, and the inner walls of locking plate 78c holes, that serve as guiding surfaces when the holes 80c and 82c roll over rotatably rollers 96c and 98c outer surfaces 128c and 130c, respectively, while the external teeth 72c of planetary external gear 38c engage the internal teeth 124c of the planetary output internal gear 36c, forcing it and subsequently the output pinion 48c rigidly connected to it, to rotate uniformly about axis of rotation 42c, in the same direction as the direction of rotation of helical gear 20c, but at a lower speed, defined by the relation (2c). Here, the planar motion of eccentric planetary gear 38c is similar to the motion pattern of two imaginary planar crank-rocker parallelogram mechanisms having the eccentric distance as the crank linkage and the distance between centers of rollers and locking plate holes as the rocker linkages.

In order to properly align axially the second-stage gear reduction mechanism subassembly within the housing 12c, relatively to the first-stage gear reduction mechanism subassembly, a steel spring washer element 136c is provided in tension against the housing inner wall. Likewise, towards the opposite end, the second-stage gear reduction mechanism subassembly is axially aligned by a metal washer cup 138c supported by a rubber ring 140c.

Any attempt of the planetary output internal gear 36c to drive back the planetary eccentric external gear 38c in an opposite direction, due to a possible sudden change in direction of the output pinion 48c external torque load, resulting for example from an unfortunate accident, is prevented by the rollers 96c and 98c that hold the locking plate in a fixed position through the fixed pins 88c and 90c. In other words, the two imaginary planar crank-rocker parallelogram mechanisms having the eccentric distance e as the crank linkage and the distance between centers of rollers and locking plate holes as the rocker linkages, cannot operate when the length of rockers links tend to be modified. Therefore, the planetary output internal gear 36c cannot back drive the planetary eccentric external gear 38c and accordingly the helical gear 20c, in an opposite direction around its axis of rotation 42c.

Finally, it should be appreciated that this embodiment 150c, of current disclosure will prevent both: reverse rotation of the electric motor shaft that drive the actuator thereby protecting it from damage, as well as the rotation of the pinion 48c, thereby preventing the loss of current height or tilt position of a vehicle seat in which the actuator is incorporated.

All the above formulated considerations are also valid for the case in which the electric motor shaft 22c is rotating initially in an opposite direction. It could be emphasized that the teeth 72c and 124c can have a conical involute profile. It could be mentioned that an alternative simplified design of this embodiment, without using rollers could have all locking plate guiding holes covered by self-lubricated snap-in plastic sleeves that roll directly on the steel pins.

The locking plate 78c circular cutouts journal surfaces that roll on fixed pins circular bearing surfaces can be used as support and guidance of planetary external gear 38c on its plan-parallel circular path movement while engaging the internal teeth of output planetary gear 36c, and not for driving or torque transmission role. The eccentric 32 is the crank linkage and the only driving member of all parallelogram mechanisms used for achieving the anti-back driving capability. Because the crank is driven by a continuous constant torque, the dead-point drawback, characteristic to regular parallelogram mechanism do not exist in this embodiment of the present disclosure. As already mentioned, for increasing the efficiency, a set of rollers are installed on fixed pins outer surfaces such that they can freely rotate about fixed pins axes. As such, a rolling contact is taking place between the outer bearing surface of these rollers and the bearing internal surfaces of the locking plate guiding holes. Moreover, through an optimized arrangement of the fixed pins, the radial forces along the contact rolling lines and consequently the friction power losses, are reduced considerably.

Significant friction losses are present in sliding contacts between the components that contribute to the mechanism anti-back drive capability. Replacing all surface-to-surface sliding contacts, between the adjacent moving components of the second-stage gear reduction mechanism by theoretical line-to-line rolling contacts and using grease as lubricant, will increase the mechanical efficiency of this embodiment by an estimated (7-15)% percent. Moreover, in order to further reduce the friction in operation, the helical gear body 34c has special recess features 142c and 144c, such that total estimated efficiency of this third embodiment of the novel electric powered two-stage gear reduction mechanism, with anti-back drive capability, improved mechanical efficiency and reduced backlash gear system is rated in the range of (30-35)%.

In order to attach this third embodiment of the novel electric powered two-stage gear reduction mechanism, to a vehicle seat structure, for seat height and/or tilt position adjustment, for a specific architecture, a set of multiple studs 146c and 148c fixed within cover plate 60c are considered appropriately.

Referring now to FIGS. 8A-8H, a fourth embodiment of the novel electric powered two-stage gear reduction mechanism, with anti-back drive capability, improved mechanical efficiency and reduced backlash gear system, is indicated generally by the reference number 150d.

An electric motor 10d, flanged to the gear reduction mechanism rigid plastic housing 12d by a set of multiple screws 14d, delivers a high-speed uniform rotational speed and a relatively low torque that are transmitted to the first-stage input gear reduction mechanism 16d, of an orthogonal-type, comprising a worm-face gear drive, that reduces the input speed and increases the input torque.

Figure 8A:
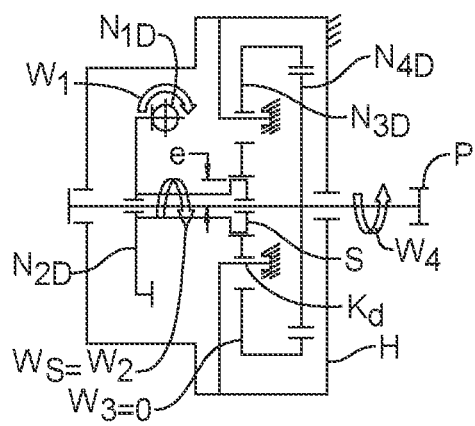
FIG. 8A is a schematic view of the fourth embodiment of a gear reduction mechanism with conical involute teeth according to the principles of the present disclosure.
Figure 8B:
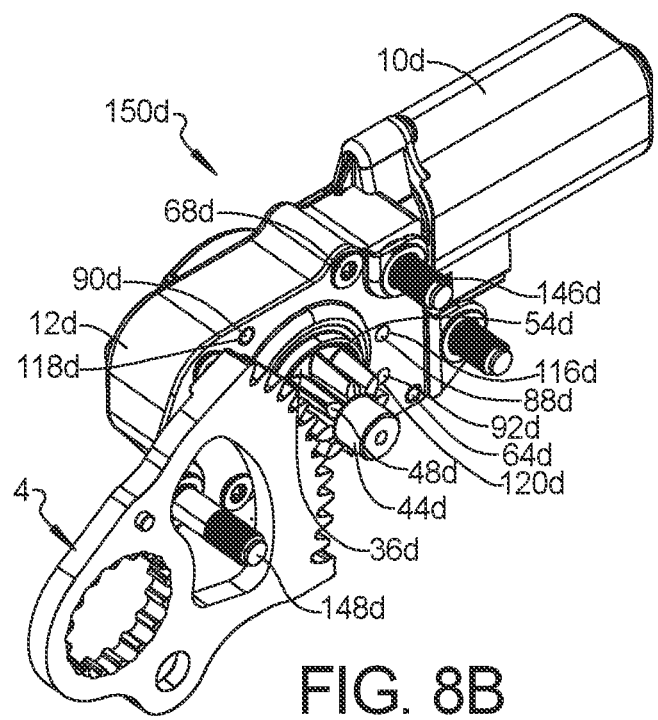
FIG. 8B is a perspective view of the fourth embodiment of the novel electric powered two-stage gear reduction mechanism, with anti-back drive capability and improved mechanical efficiency, specifically used for a vehicle seat height and/tilt position adjustment, according to the present disclosure.
Figure 8C:
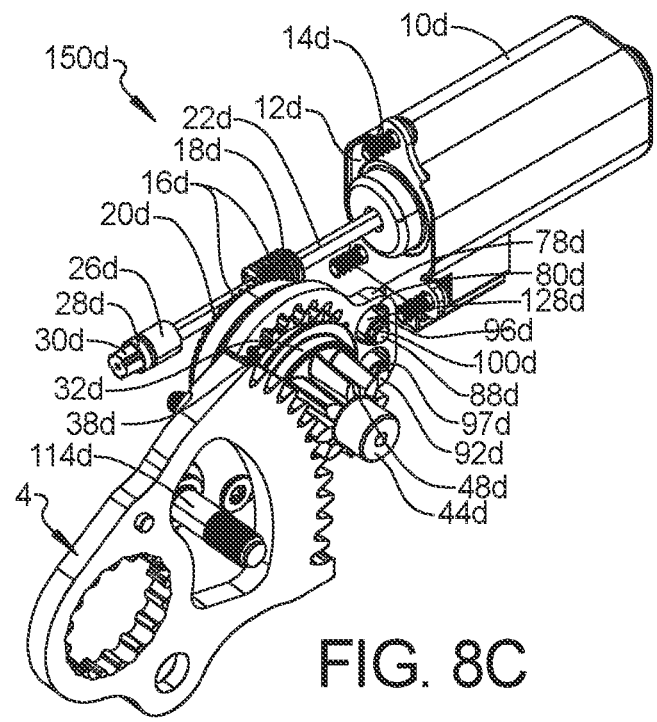
FIG. 8C is a perspective cutaway view of the eleventh embodiment of the novel electric powered two-stage gear reduction mechanism, shown in FIG. 8B.
Figure 8D:
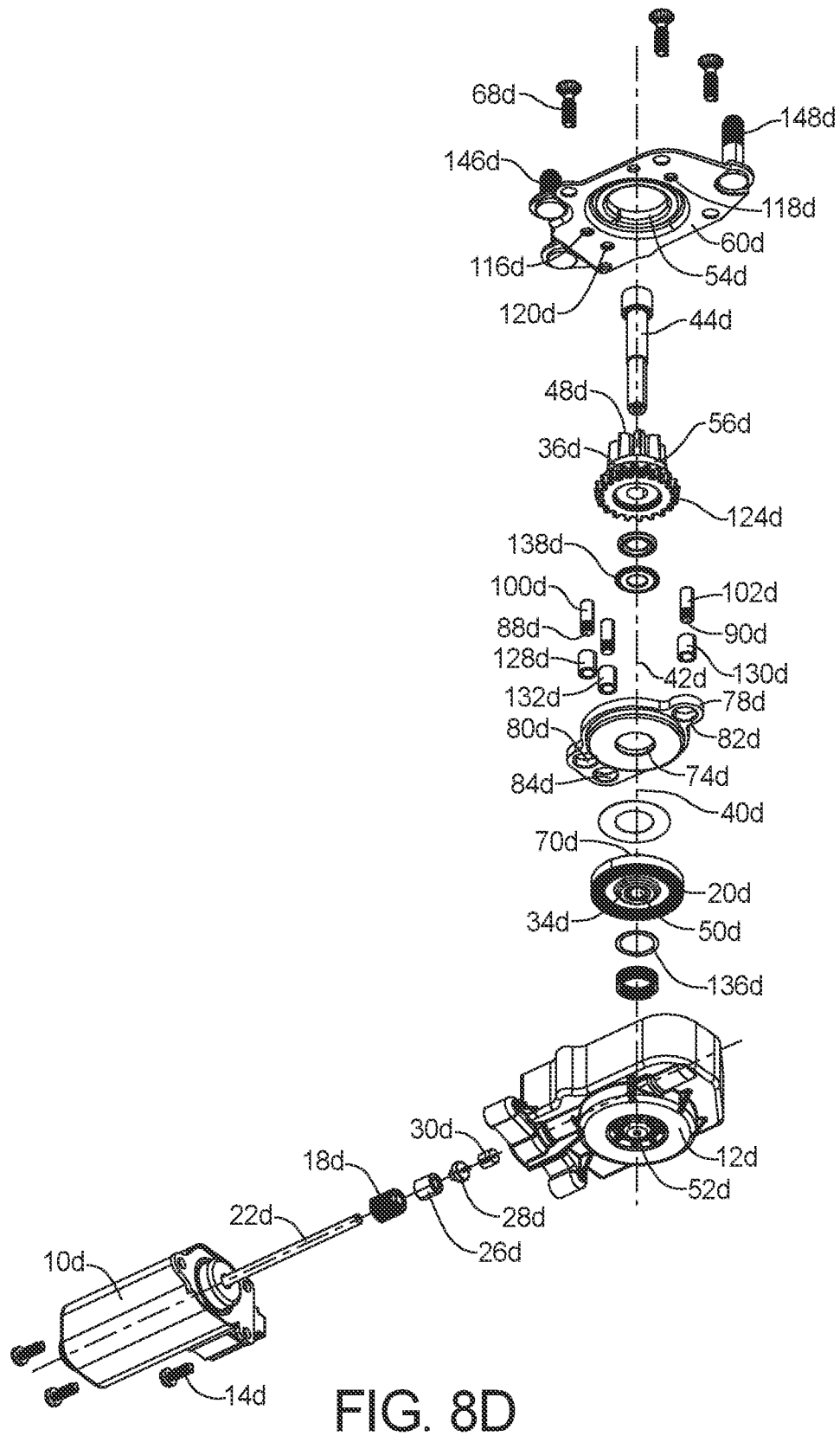
FIG. 8D is a perspective exploded view of the eleventh embodiment of the novel electric powered two-stage gear reduction mechanism, shown in FIG. 8B.
Figure 8E:
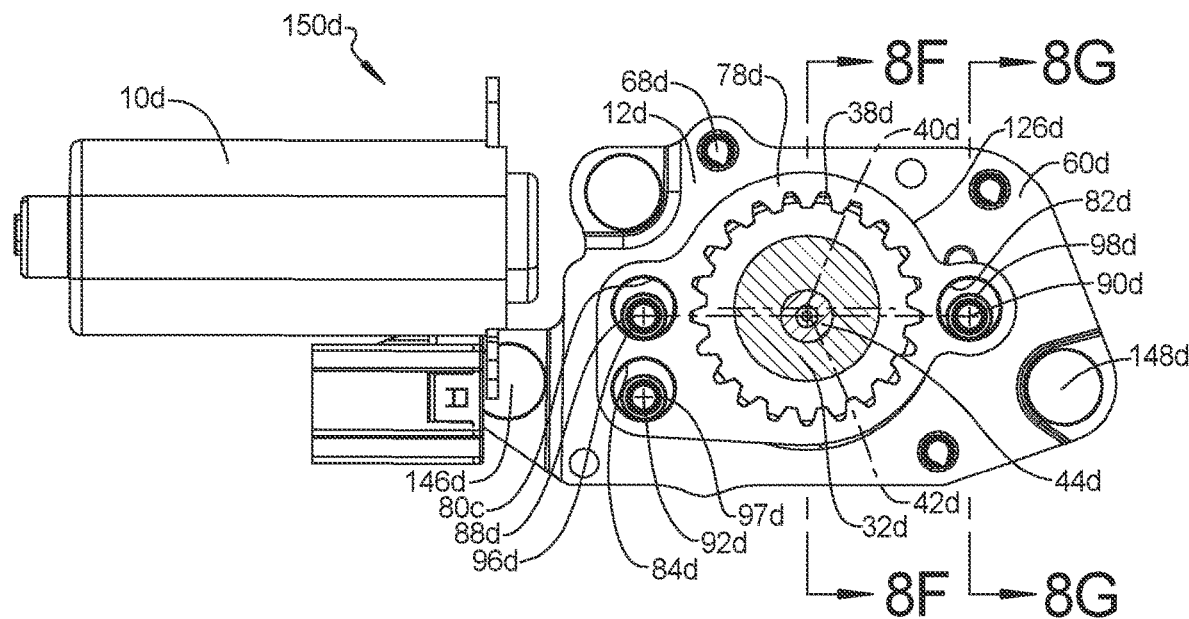
FIG. 8E is a sectional view along the line A-A, perpendicular to both, the direction of output pinion axis and the direction of fixed pins axes and, parallel to the plane of movement of three-orthogonally pins locking plate shown in FIG. 8D.
Figure 8F:
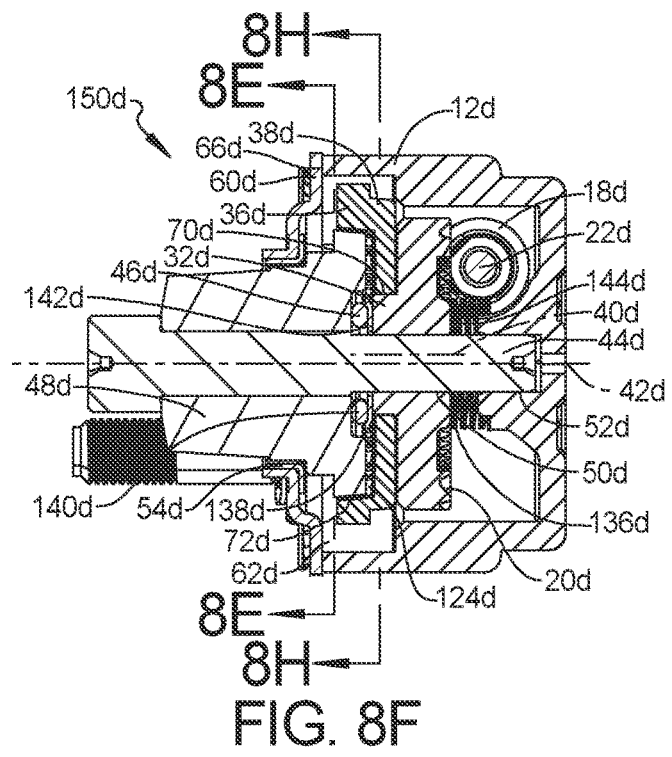
FIG. 8F is a sectional view along the line B-B, containing the output pinion axis and perpendicular to the plane of movement of three-orthogonally pins locking plate shown in FIG. 8D.
Figure 8G:
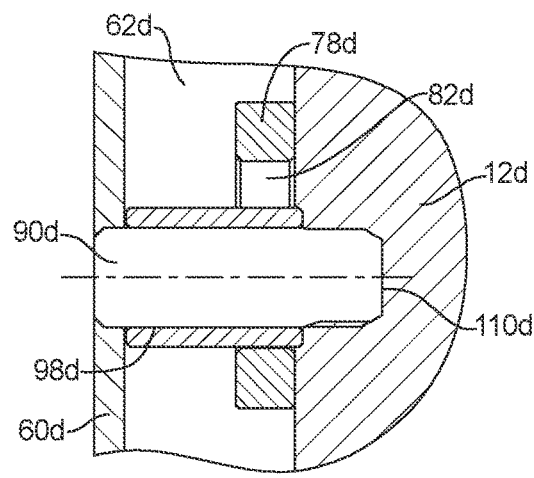
FIG. 8G is a sectional view along the line C-C, containing one of the fixed pins axis and perpendicular to the plane of movement of three-orthogonally pins locking plate shown in FIG. 8D.
Figure 8H:
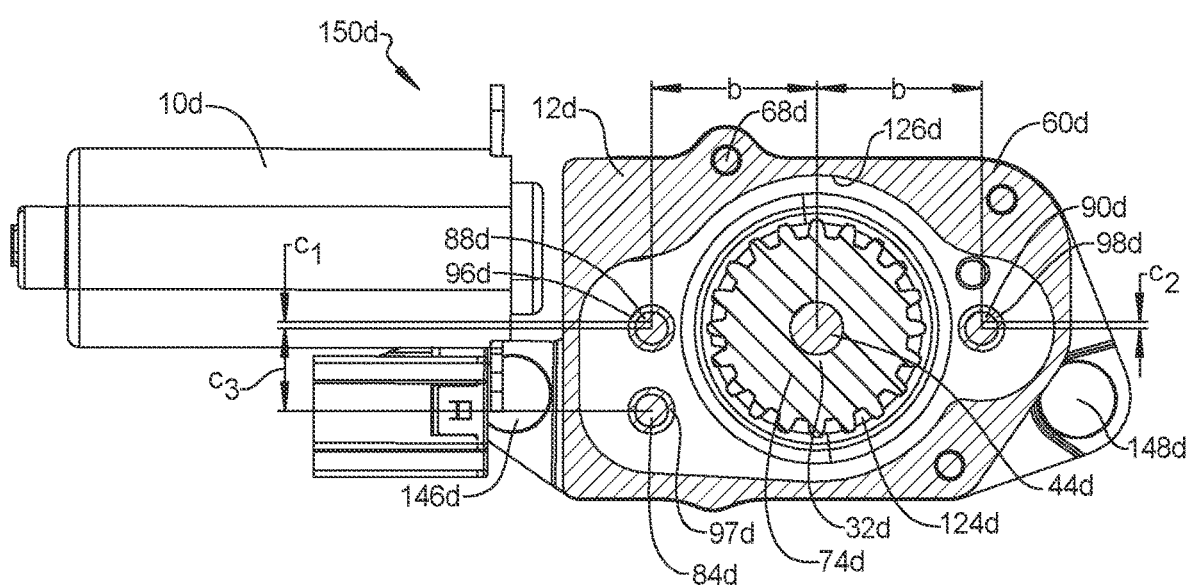
FIG. 8H is a sectional view along the line D-D, perpendicular to both, the direction of output pinion axis and the direction of fixed pins axes, and passing through the middle face width of both external and internal gears teeth in mesh, shown in FIG. 8D.
Figure 9:
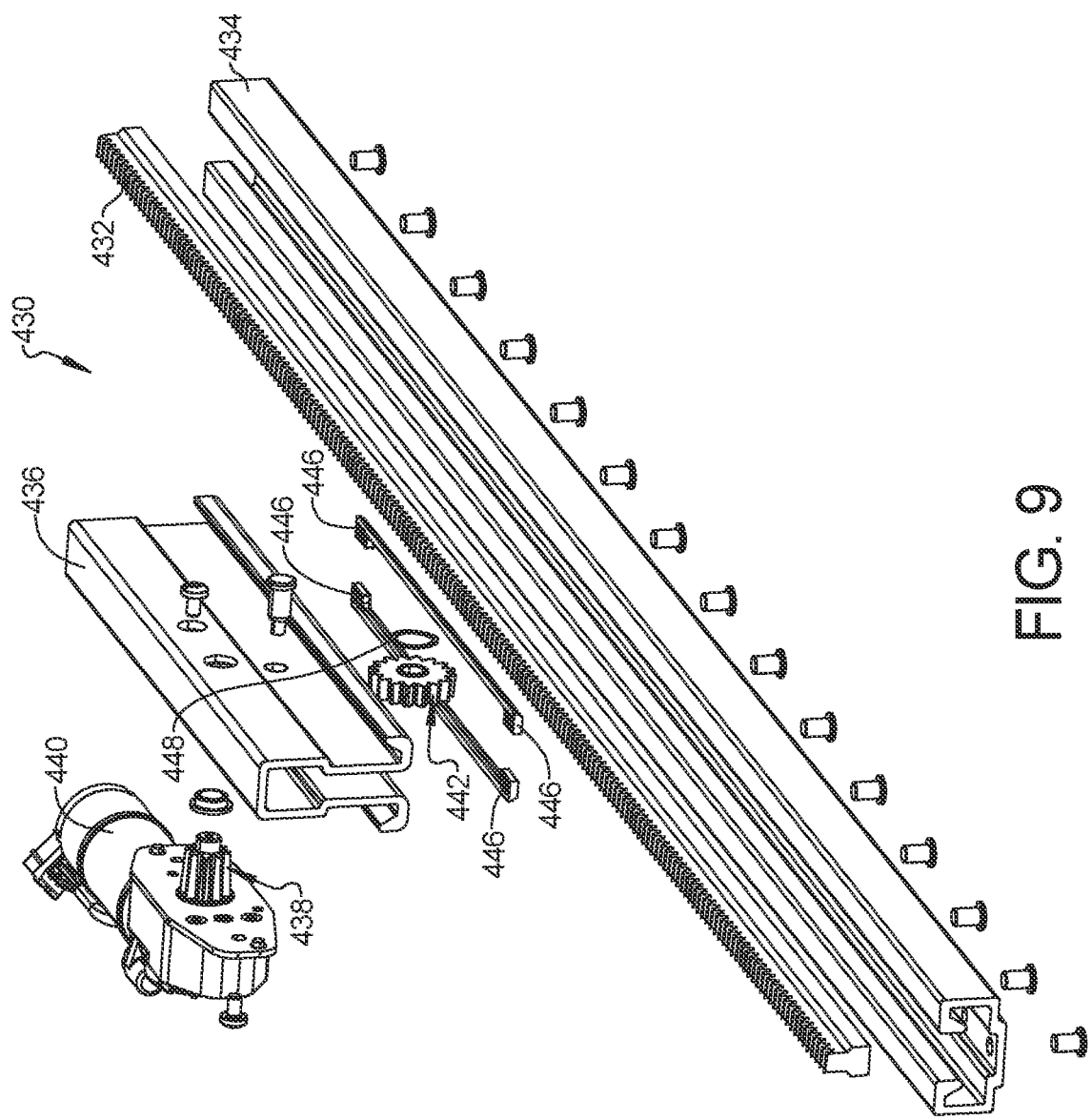
FIG. 9 is an exploded perspective view of pinion-idled gear-rack seat length adjustment mechanism for a vehicle seat.
Figure 10:
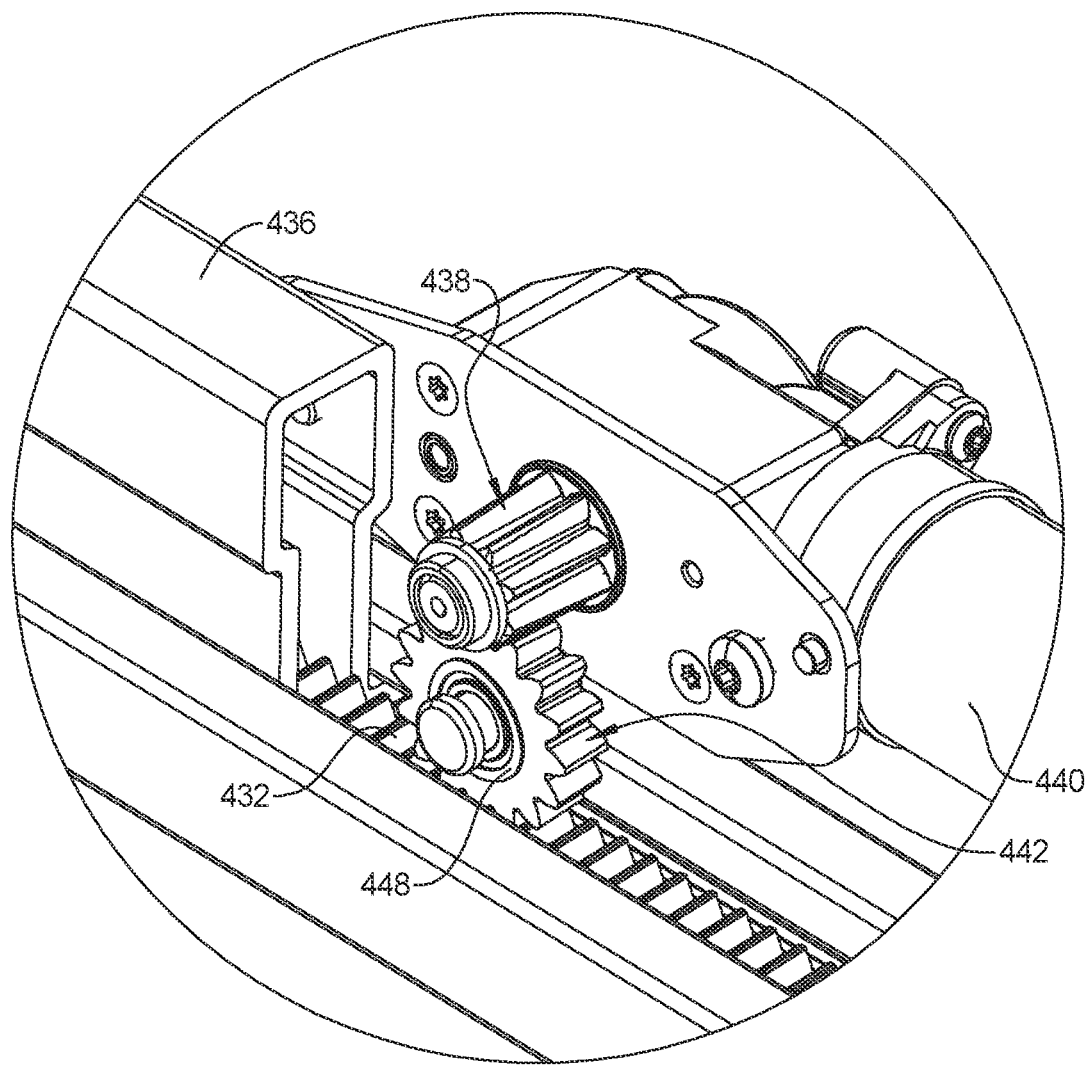
FIG. 10 is a partial cutaway detailed perspective view of the pinion-idled gear-rack with conical involute teeth according to the principles of the present disclosure.
Figure 11:
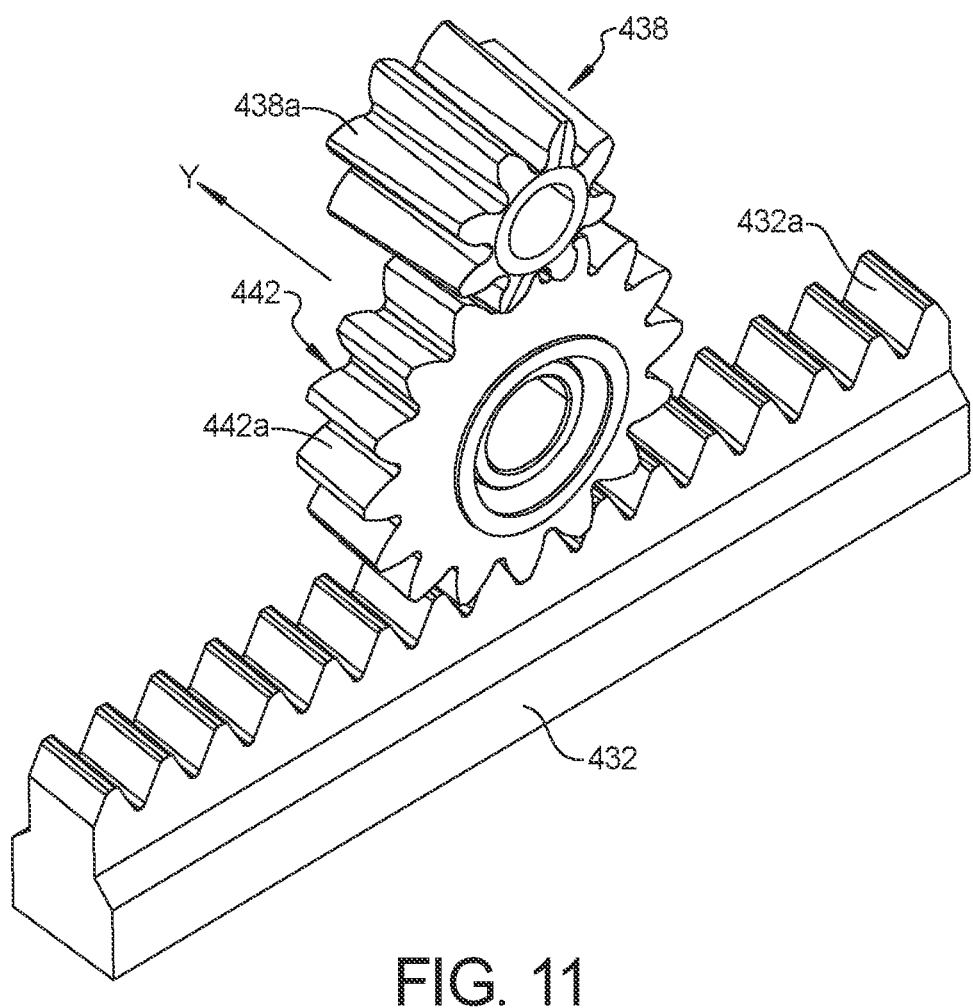
FIG. 11 is a detailed perspective view of the pinion-idler gear-rack drive system with conical involute teeth according to the principles of the present disclosure.

The reduction ratio of the first-stage input gear reduction mechanism 16d is defined by expression:

$$i_{12} = \frac{\omega_1}{\omega_2} = \frac{N_{2D}}{N_{1D}} \tag{1d}$$

where according to FIG. 8A, $\omega_1$, $N_{1D}$ and $\omega_2$, $N_{2D}$, with $N_{2D} > N_{1D}$ and $\omega_2 < \omega_1$, are the constant angular velocities and, the number of starts and teeth of the worm 18d and face gear 20d, respectively.

The worm 18d is rigidly connected to the electric motor rotor shaft 22d at a certain distance along it by a special press fit feature, such that properly meshes the face gear 20d. At the end opposing the electric motor, the rotor shaft 22d is rotatably supported into the housing aperture 24d being guided radially by a bearing bushing 26d and axially through an antifriction compound element 28d elastically supported and guided by a rubber ring stopper 30.

Through the output member of a first-stage gear speed reduction mechanism, namely the face gear 20d, made from a plastic material, preferably PEEK, the already reduced uniform rotational speed $\omega_2$ is transmitted to an eccentric 32d, shaped on the face gear body 34d, that is the input element of the second-stage gear reduction mechanism with anti-back drive capability and improved mechanical efficiency.

The reduction ratio of the second-stage gear reduction mechanism, of a planetary-type is defined by the expression:

$$i_{s4} = \frac{\omega_s}{\omega_4} = +\frac{N_{4D}}{N_{4D} - N_{3D}} \tag{2d}$$

where according to FIG. 8A, $\omega_s$ and $\omega_4$ are the constant angular velocities of the eccentric S and planetary output internal conical involute gear 36d, respectively, while $N_{4D}$ and $N_{3D}$ are the number of teeth of the planetary output internal conical involute gear 36d and planetary eccentric external conical involute gear 38d, respectively, with $N_{4D} > N_{3D}$ and $\omega_4 < \omega_s$. It should be also noted that $\omega_s = \omega_2$ and, the constant angular velocity of the planetary eccentric external gear 38d, $\omega_3 = 0$ due to coupling or compensating arrangement $K_K$ that uses rolling contact action between mechanism adjacent elements during torque transmitting operation. As such, the planetary eccentric external gear 38d will not rotate around its own axis of rotation 40d, but rather will have a wobbling circular movement around the axis of rotation 42d of the rigid shaft 44d, on which the planetary output internal gear 36d is rigidly fixed through a splined arrangement 46d. The output pinion 48d is rigidly connected to the rigid shaft 44d through a press-fit connection.

According to FIG. 8A, the plus sign (+) in expression (2d) shows that the eccentric S and the planetary output internal gear 36d having the number of teeth $N_{4D}$ are rotating in the same direction.

The absolute value of reduction ratio of the fourth embodiment of an electric powered two-stage gear reduction mechanism, specifically used for a vehicle seat height and/or tilt position adjustment, with anti-back drive capability, improved mechanical efficiency and reduced backlash gear system, is defined by the expression:

$$i_{14} = \frac{\omega_1}{\omega_4} = i_{12} \cdot i_{s4} = \frac{N_{2D} \cdot N_{4D}}{N_{1D} \cdot (N_{4D} - N_{3D})} \tag{3d}$$

For a given eccentricity e, if the difference between the number of teeth $N_{4D}$ and $N_{3D}$ of the output internal gear 36d and planetary eccentric external gear 38d, is chosen such that:

$$N_{4D} - N_{3D} = 1 \tag{4d}$$

then the relation (3d) becomes the expression of the maximum possible gear reduction ratio of a very compact two-stage gear reduction mechanism of the fourth embodiment type with anti-back drive capability, improved mechanical efficiency and reduced backlash gear system, as described by:

$$i_{14} = \frac{\omega_1}{\omega_4} = \frac{N_{2D} \cdot N_{4D}}{N_{1D}} \tag{5d}$$

The eccentric 32d, having the eccentricity value e, as well as the planetary eccentric external gear 38d, is rotatable supported through its cylindrical bore 50d on the continuous configuration axle shaft 44d, made from steel, that has the toothed output pinion 48d, integrally formed shank type, rigidly connected by keys, splines or laser welded to the shaft itself at its driven end. The rigid axle shaft 44d is rotatable supported at its both ends: into the housing central bearing 52d, through its cylindrical bearing surface having its axis of rotation 42d, and into coaxially central bearing sleeve 54d through the cylindrical external bearing surface 56d of planetary output internal gear 36d. The coaxially central bearing sleeve 54d is made from a compound anti-friction material, pressed-fixed into the central aperture 58d of a stamped steel cover plate 60d, that is rigidly centered and fastened towards the housing 12d central cavity 62d by a set of guiding pins 64d injection molded on housing frontal surface 66d and a set of multiple screws 68d, respectively. The eccentric 32d of face gear 20d, has a bearing cylindrical surface 70d, of radius $R_s$ protruding from one of its side faces, whose axis of rotation 40d is placed at eccentricity e relative to the axis 42d of the rigid shaft 44d, on which planetary eccentric gear 38d with external teeth 72d protruding from one of its side faces is rotatably sliding fit mounted through its cylindrical bore 74d and which can freely rotate upon. The eccentric 32d may have also metal insert as cylindrical bearing surface 70d to avoid the wear during operation.

The planetary eccentric gear 38d forms a unitary part with a locking plate 78d, provided with three cylindrical guiding holes 80d, 82d and 84d supported and rotatably mounted on three cylindrical pins 88d, 90d and 92d through three cylindrical rollers 96d, 97d and 98d, having their outer surfaces of radii $R_f$ and which can freely rotate upon the pins cylindrical surfaces 100d, 101d and 102d, respectively. In this advantageous embodiment the rollers pins 88d, 90d and 92d are made from steel, while the rollers 96d, 97d and 98d are made from a self-lubricated plastic material or from a plastic material resistant to high temperature as PEEK, for reducing the friction, wear and noise in operation. In order to avoid their bending during operation, the pins are fixed mounted and supported at their both ends, by a press fit into the housing blind holes 108d, 110d and 112d, as well as by a sliding fit into the cover plate 60d through holes 116d, 118d and 120d, respectively. The planar position of the three cylindrical pins axes, in an arbitrary plane perpendicular to the housing central bearing surface 52d axis 42d is defined by four parameters relative to an orthogonal coordinate system $O_F X_F Y_F Z_F$ having the $O_F Z_F$ axis direction overlapping the direction of housing central bearing axis 42d and the orthogonal to each other coordinate planes $O_F X_F Y_F$ and $O_F Y_F Z_F$ perpendicular to, respectively, containing the axis 42d. Thus, relative to the plane $O_F Y_F Z_F$ the axes of pins 88d, 90d and 92d are placed symmetrically at a distance b, while relative to the plane $O_F X_F Z_F$ the same axes are placed asymmetrically at a distance $c_1=0$, $c_2=0$ and $c_3=c$, respectively, from considerations related to radial loads and rolling contact friction reduction, e.g. mechanical efficiency improvement. The position of cylindrical guiding holes of radii ($R_f$+e) on locking plate 78d is such that when the planetary gear 38d is rotatably sliding fitted on the eccentric bearing cylindrical surface 70d through its cylindrical central bore surface 74d, then the rollers 96d, 97d and 98d will be directly positioned in the guiding holes 80d, 82d and 84d with a sliding fit between the rollers cylindrical outer surfaces, and the inner walls of locking plate guiding holes 80d, 82d and 84d, respectively. The locking plate 78d specific shape allows not only for a reliably support in absorbing the shock loads but also for a minimum weight.

The planetary eccentric gear 38d and the locking plate 78d implicitly, made from steel by precision stamping or, from powder metal by a sintering process executes a wobbling motion such that its external teeth 72d are meshing with the internal teeth 124d of the planetary output internal gear 36d having a cup shape form and made also from steel, by precision stamping or from powder metal by a sintering process. Both gears are in adjacent parallel relationship to each other, during their entire engagement gears 38d and 36d having their pitch circles radii $R_{3D}$ and $R_{4D}$ defined by the relations:

$$\begin{cases} R_{3D} = \dfrac{e \cdot N_{3D}}{N_{4D} - N_{3D}} \\ R_{4D} = \dfrac{e \cdot N_{4D}}{N_{4D} - N_{3D}} \end{cases} \quad (6d)$$

where $R_{3D} < R_{4D}$.

During the rotation of the face gear 20d and, implicitly of eccentric 32d, in an arbitrary direction, with a uniform rotational speed $\omega_s$, the point of tangency between the gears pitch circles travels along these circles, such that the planetary external gear 38d describes a wobbling motion within housing central cavity 126d, relative to the housing central bearing surface axis of rotation 42d. In fact, this circular path plane-parallel motion of radius equal to the eccentricity e of planetary external gear 38d, free of rotation about its own axis of rotation 40d is realized using rolling contact action through a set of coupling or compensating arrangements including rollers 96d, 97d and 98d, and the inner walls of locking plate 78d holes, that serve as guiding surfaces when the holes 80d, 82d and 84d roll over rotatably rollers 96d, 97d and 98d outer surfaces 128d, 130d and 132d, respectively, while the external teeth 72d of planetary external gear 38d engage the internal teeth 124d of the planetary output internal gear 36d, forcing it and subsequently the output pinion 48d rigidly connected to it, to rotate uniformly about axis of rotation 42d, in the same direction as the direction of rotation of face gear 20d, but at a lower speed, defined by the relation (2d). Here, the planar motion of eccentric planetary gear 38d is similar to the motion pattern of three imaginary planar crank-rocker parallelogram mechanisms having the eccentric distance as the crank linkage and the distance between centers of rollers and locking plate holes as the rocker linkages.

In order to properly align axially the second-stage gear reduction mechanism subassembly within the housing 12d, relatively to the first-stage gear reduction mechanism subassembly, a steel spring washer element 136d is provided in tension against the housing inner wall. Likewise, towards the opposite end, the second-stage gear reduction mechanism subassembly is axially aligned by a metal washer cup 138d supported by a rubber ring 140d.

Any attempt of the planetary output internal gear 36d to drive back the planetary eccentric external gear 38d in an opposite direction, due to a possible sudden change in direction of the output pinion 48d external torque load, resulting for example from an unfortunate accident, is prevented by the rollers 96d, 97d and 98d that hold the locking plate in a fixed position through the fixed pins 88d, 90d and 92d. In other words, the three imaginary planar crank-rocker parallelogram mechanisms having the eccentric distance e as the crank linkage and the distance between centers of rollers and locking plate holes as the rocker linkages, cannot operate when the length of rockers links tend to be modified. Therefore, the planetary output internal gear 36d cannot back drive the planetary eccentric external gear 38d and accordingly the face gear 20d, in an opposite direction around its axis of rotation 42d.

Finally, it should be appreciated that this embodiment 150d, of current disclosure will prevent both: reverse rotation of the electric motor shaft that drive the actuator thereby protecting it from damage, as well as the rotation of the pinion 48d, thereby preventing the loss of current height or tilt position of a vehicle seat in which the actuator is incorporated.

All the above formulated considerations are also valid for the case in which the electric motor shaft 22d is rotating initially in an opposite direction. It could be emphasized that the teeth 72d and 124d can have a conical involute profile. It could be mentioned that an alternative simplified design of this embodiment, without using rollers could have all locking plate guiding holes covered by self-lubricated snap-in plastic sleeves that roll directly on the steel pins.

The locking plate 78d circular cutouts journal surfaces that roll on fixed pins circular bearing surfaces can be used as support and guidance of planetary external gear 38d on its plan-parallel circular path movement while engaging the internal teeth of output planetary gear 36d, and not for driving or torque transmission role. The eccentric 32d is the crank linkage and the only driving member of all parallelogram mechanisms used for achieving the anti-back driving capability. Because the crank is driven by a continuous constant torque, the dead-point drawback, characteristic to regular parallelogram mechanism do not exist in this embodiment of the present disclosure. As already mentioned, for increasing the efficiency, a set of rollers are installed on fixed pins outer surfaces such that they can freely rotate about fixed pins axes. As such, a rolling contact is taking place between the outer bearing surface of these rollers and the bearing internal surfaces of the locking plate guiding holes. Moreover, through an optimized arrangement of the fixed pins, the radial forces along the contact rolling lines and consequently the friction power losses, are reduced considerably.

Significant friction losses are present in sliding contacts between the components that contribute to the mechanism anti-back drive capability. Replacing all surface-to-surface sliding contacts, between the adjacent moving components of the second-stage gear reduction mechanism by theoretical line-to-line rolling contacts and using grease as lubricant, will increase the mechanical efficiency of this embodiment by an estimated (7-15)% percent. Moreover, in order to further reduce the friction in operation, the helical gear body 34d has special recess features 142d and 144d, such that total estimated efficiency of this fourth embodiment of the novel electric powered two-stage gear reduction mechanism, with anti-back drive capability, improved mechanical efficiency and reduced backlash gear system is rated in the range of (30-35)%.

In order to attach this fourth embodiment of the novel electric powered two-stage gear reduction mechanism, to a vehicle seat structure, for seat height and/or tilt position adjustment, for a specific architecture, a set of multiple studs 146d and 148d fixed within cover plate 60d are considered appropriately.

With reference to FIGS. 9-13, a fore-aft seat adjustment mechanism 430 is shown including a rack 342 connected to a track 434 and including a seat slide 436 slidably engaged with the track 434. The seat slide 436 includes a pinion gear 438 that is rotatably driven by a motor 440 which is supported by the seat slide 436. The drive connection between the motor 440 and the pinion gear 438 can be by a worm and worm gear along with a gear reduction mechanism 50, 150, 250, 350 or other known drive connection. The seat slide 436 is slidably supported on the track 434 by a plurality of bearing cages 446.

The pinion gear 438 is in meshing engagement with an idler gear 442 which is supported by the seat slide 436 and is also in meshing engagement with the rack 432. The idler gear 442 and the pinion gear 438 have parallel rotational axes and as best shown in FIGS. 10-13, each include oppositely arranged conical involute teeth 442a, 438a, respectively. The idler gear 442 is mounted on a spindle 444 that that further supports a resilient washer 448 that can include one or both of wave spring washers and/or elastic washers that bias the idler gear 442 toward the pinion gear 438 and the rack 432. The conical involute teeth have a tapered tooth thickness, a tapered root and a tapered outside diameter. The rack 432 is a straight-sided basic rack which has its reference pitch plane inclined with the conical involute angle relative to attachment surface 432b. The conical involute teeth 442a, 438a together with 432a of the idler gear 442, pinion gear 438 and the rack 432 that are biased more tightly into engagement with one another by the resilient washer(s) 448 eliminate or reduce backlash. As best shown in FIG. 12, the conical involute teeth 438a of the pinion gear 438 have a first diameter D1 from an axis of rotation at one axial end of the tooth that tapers outward to a larger second diameter D2 at the other axial end of the tooth. Likewise, as best shown in FIG. 12, the conical involute teeth 442a of the idler gear 442 have a first diameter d1 from an axis of rotation at one axial end of the tooth that tapers outward to a larger second diameter d2 at the other axial end of the tooth. Similarly, the teeth 432a of the rack 432 have a height H1 at one axial end of the teeth 432a that is shorter than a second height H2 at a second axial end of the teeth 432a only due to particular attachment of basic rack to the track 434. The motor 440 drives the pinion gear 438 and idler gear 442 to cause the seat slide 436 to traverse along the track 434 in order adjust a fore-aft position of a seat mounted to the seat slide 436.

Figure 14:
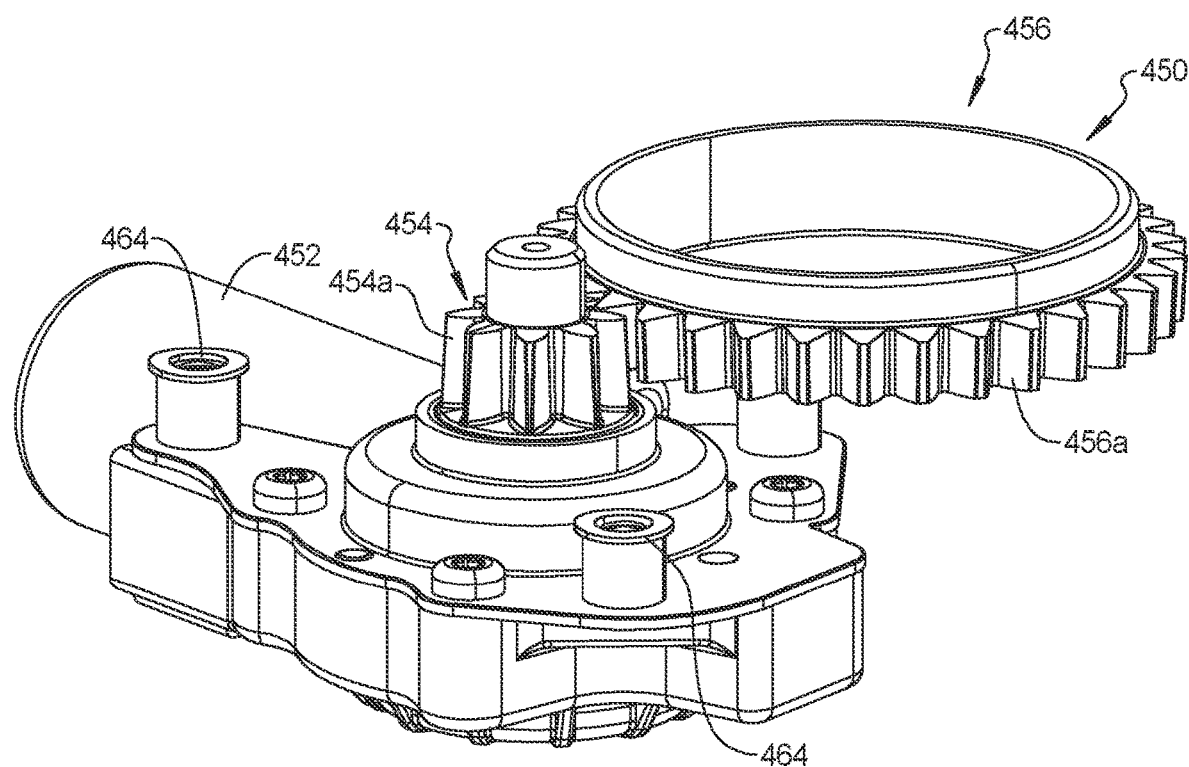
FIG. 14 is a perspective view of a pinion-external ring swivel mechanism with conical involute teeth for a car seat.
Figure 15:
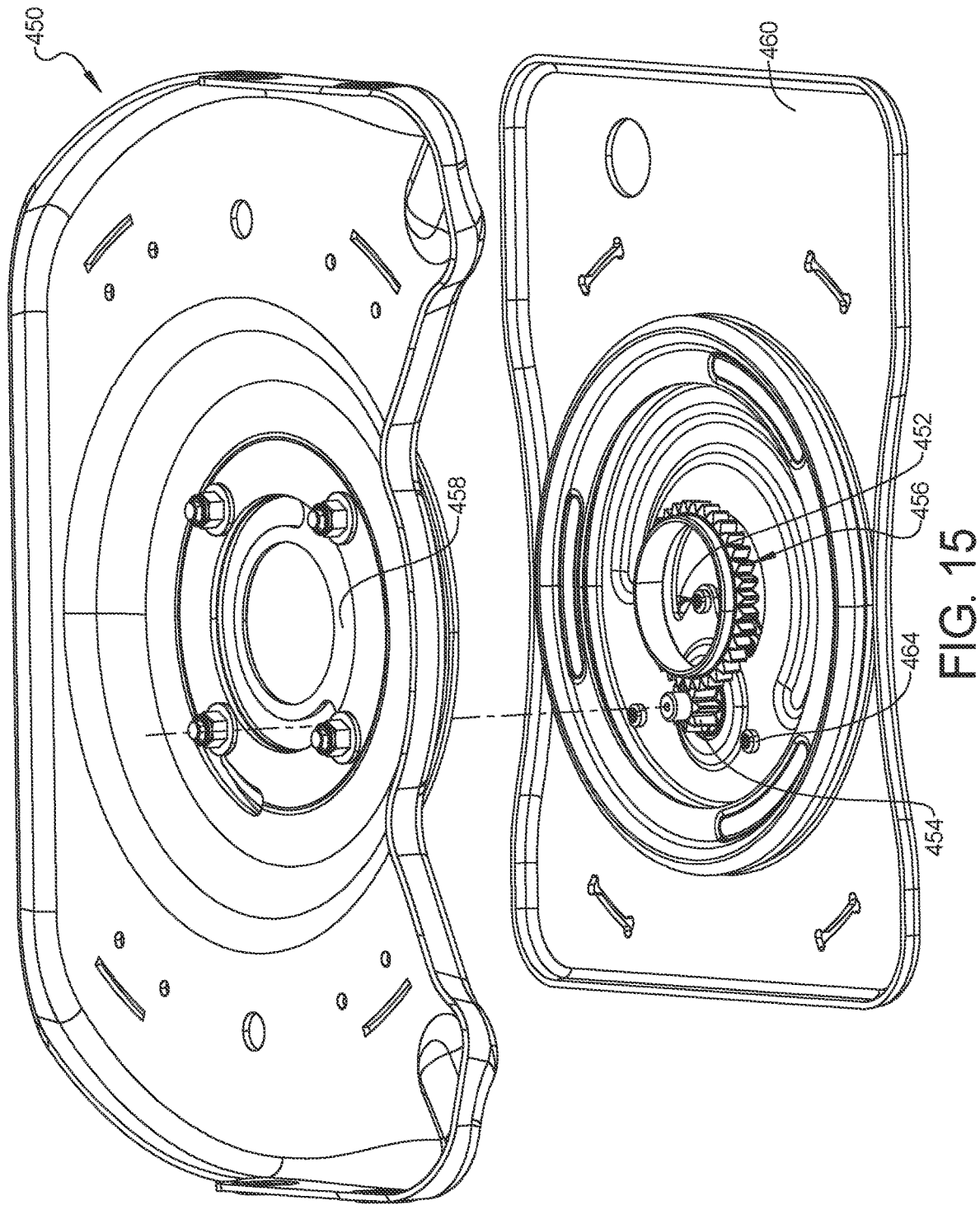
FIG. 15 is a cut-away perspective view of the car seat swivel mechanism with external conical involute teeth.
Figure 16:
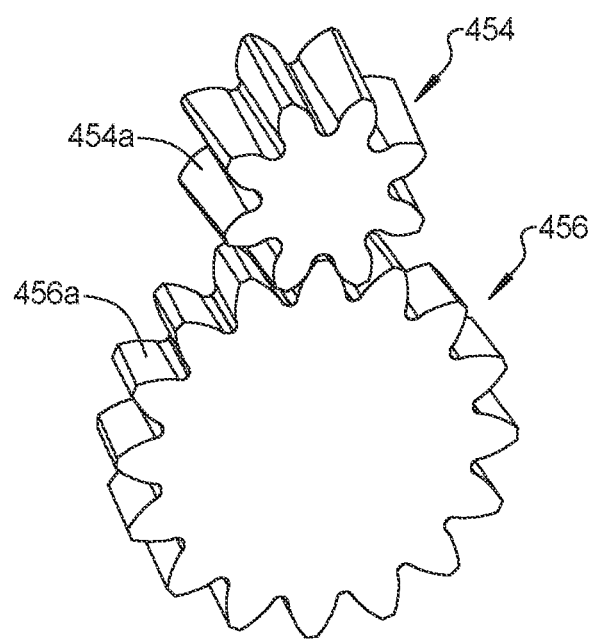
FIG. 16 is a perspective view of pinion gear and external swivel ring with conical involute teeth according to the principles of the present disclosure.

With reference to FIGS. 14-16, a seat swivel mechanism 450 is shown including a motor 452 that dives a pinion gear 454 that is drivingly engaged with an external ring gear 456. The external ring 456 has external teeth 456a and is connected to a rotatable seat base 458 (best shown in FIG. 15) such that rotation of the external ring 456 swivels the seat. The pinion gear 454 is rotatably driven by a motor 452 which is drivingly connected to the pinion gear 454 by a transmission mechanism 453 that includes a housing 453a that can contain a worm and worm gear along with a gear reduction mechanism 50, 150, 250, 350 or other known gear reduction mechanism. The housing 453a can be mounted to a seat base 460 by a plurality of bolts 462 that each receive resilient washers 464 that can include one or both of wave spring washers and/or elastic washers that allow for axial adjustment of the pinion gear 454 relative to the external ring 456. The transmission mechanism 453 between the motor 452 and the pinion gear 454 can be by a worm and helical gear or other known drive connection. The pinion gear 454 and the external ring gear 456 have parallel rotational axes and as best shown in FIG. 16, each include oppositely arranged conical involute teeth 454a, 456a, respectively. The conical involute teeth have a tapered tooth thickness, a tapered root and a tapered outside diameter. The resilient washers 464 allow for axial adjustment of the pinion gear 454 relative to the external ring 456 so that the conical involute teeth 454a, 456a eliminate or reduce backlash.

Figure 17:
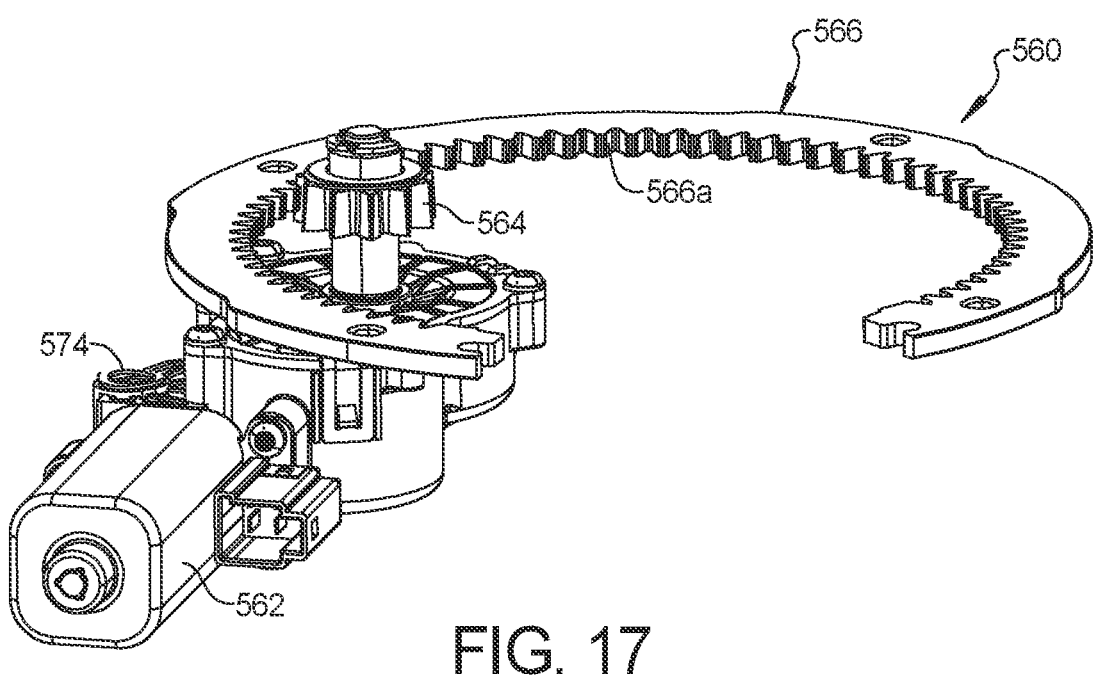
FIG. 17 is a perspective view of a pinion-internal ring swivel mechanism with conical involute teeth for a car seat.
Figure 18:
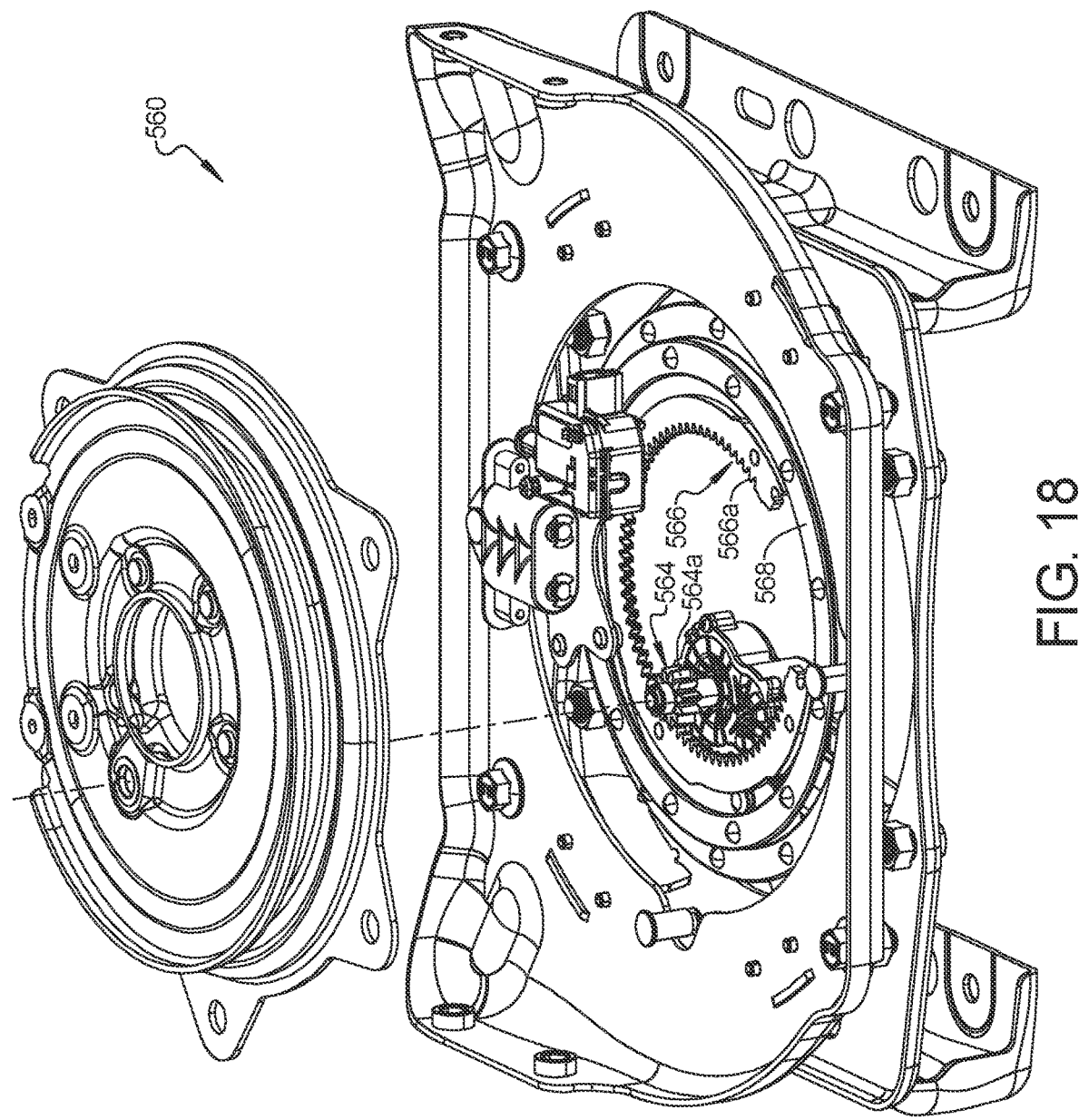
FIG. 18 is a cut-away perspective view of the car seat swivel mechanism with internal conical involute teeth.

With reference to FIGS. 17-19, a seat swivel mechanism 560 is shown including a motor 562 that dives a pinion gear 564 that is drivingly engaged with an internal ring gear 566. The internal ring 566 has internal teeth 566a and is connected to a rotatable seat base 568 (best shown in FIG. 18) such that rotation of the external ring 566 swivels the seat. The pinion gear 564 is rotatably driven by a motor 562 which is drivingly connected to the pinion gear 564 by a transmission mechanism 563 that includes a housing 563a that contains a worm and worm gear along with a gear reduction mechanism 50, 150, 250, 350 or other known gear reduction mechanism. The housing 563a can be mounted to a seat base 570 by a plurality of bolts 572 that each receive resilient washers 574 that can include one or both of wave spring washers and/or elastic washers that allow for axial adjustment of the pinion gear 564 relative to the internal ring 566. The transmission mechanism 563 between the motor 562 and the pinion gear 564 can be by a worm and helical gear or other known drive connection. The pinion gear 564 and the internal ring gear 566 have parallel rotational axes and as best shown in FIG. 19, each include oppositely arranged conical involute teeth 564a, 566a, respectively. The conical involute teeth have a tapered tooth thickness, a tapered root and a tapered outside diameter. The conical involute teeth 564a, 566a eliminate or reduce backlash.

With reference to FIGS. 20A-20B, a planetary gear system 670 is shown including an internal gear 672 and an external gear 674 meshingly engaged with the internal gear 672. The internal gear 672 and the external gear 674 have parallel rotational axes and as best shown in FIG. 20B, each include oppositely arranged conical involute teeth 672a, 674a, respectively. The conical involute teeth have a tapered tooth thickness, a tapered root and a tapered outside diameter. The external gear 674 is smaller in diameter and has a reduced number of teeth 674a in comparison to a diameter and number of teeth of the internal gear 672. The internal gear 672 and the external gear 674 are shown as a gear reduction mechanism of the pinion gear 20 of the pinion-sector gear seat recline mechanism of FIGS. 1-4, although the planetary gear system 670 can have various other applications. The conical involute teeth 672a, 674a eliminate or reduce backlash.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle seat adjustment mechanism, comprising:
a first component;
a second component movable relative to the first component;
a drive mechanism drivingly connected to the second component for moving the second component relative to the first component, the drive mechanism including a first gear member having conical involute teeth, the first gear member drivingly connected to a drive motor, a second gear member having conical involute teeth in meshing engagement with the conical involute teeth of the first gear member; and
a resilient member allowing adjustment of one of the first gear member and the second gear member relative to the other of the first gear member and the second gear member,
wherein the drive mechanism includes a gear reduction mechanism providing a driving connection between the drive motor and the first gear member,
wherein the gear reduction mechanism includes an eccentric rotatably connected to the drive motor and a locking plate that engages the eccentric and one of a planetary gear and a ring gear and the other of the planetary gear and the ring gear is drivingly connected to the first gear member,
wherein the planetary gear includes exterior conical involute teeth and the ring gear includes interior conical involute teeth.

2. The vehicle seat adjustment mechanism according to claim 1, wherein the first gear member is a pinion gear.

3. The vehicle seat adjustment mechanism according to claim 2, wherein the second gear member is a sector gear.

4. The vehicle seat adjustment mechanism according to claim 3, wherein the first component is a seat base and the second component is a seat bottom.

5. The vehicle seat adjustment mechanism according to claim 2, wherein the second gear member is a rack.

6. The vehicle seat adjustment mechanism according to claim 5, wherein the first component is a rail and the second component is a slide unit on which a seat base is mounted.

7. The vehicle seat adjustment mechanism according to claim 2, wherein the second gear member is a ring gear.

8. The vehicle seat adjustment mechanism according to claim 7, wherein the first component is a vehicle floor and the second component is a seat that is swivelable relative to the vehicle floor.

9. The vehicle seat adjustment mechanism according to claim 8, wherein the ring gear includes interior conical involute teeth.

10. The vehicle seat adjustment mechanism according to claim 8, wherein the ring gear includes exterior conical involute teeth.

11. The vehicle seat adjustment mechanism according to claim 1, wherein the first component is a seat bottom and the second component is a seat back and the drive mechanism is a recliner mechanism for moving the seat back relative to the seat bottom.

12. The vehicle seat adjustment mechanism according to claim 1, wherein the first component is a rail and the second component is a slide unit on which a seat base is mounted and the drive mechanism is a seat adjustment mechanism for moving the slide unit relative to the rail.

13. The vehicle seat adjustment mechanism according to claim 1, wherein the resilient member is a wave spring.

14. The vehicle seat adjustment mechanism according to claim 1, wherein the resilient member is made from a resilient material.

15. The vehicle seat adjustment mechanism according to claim 1, wherein the locking plate engages two pins on the one of the planetary gear and the ring gear.

16. A vehicle seat adjustment mechanism, comprising:
a first component;
a second component movable relative to the first component;
a drive mechanism drivingly connected to the second component for moving the second component relative to the first component, the drive mechanism including a first gear member having conical involute teeth, the first gear member drivingly connected to a drive motor, a second gear member having conical involute teeth in meshing engagement with the conical involute teeth of the first gear member; and
a resilient member allowing adjustment of one of the first gear member and the second gear member relative to the other of the first gear member and the second gear member,
wherein the drive mechanism includes a gear reduction mechanism providing a driving connection between the drive motor and the first gear member, and
wherein the gear reduction mechanism includes an eccentric rotatably connected to the drive motor and engaged with a wobbling planetary gear with exterior conical involute teeth that engage interior conical involute teeth of a ring gear that is drivingly connected to the first gear member, the wobbling planetary gear including a locking plate with at least two guiding holes that each receive a respective cylindrical pin mounted to a housing of the gear reduction mechanism.

17. The vehicle seat adjustment mechanism according to claim 16, wherein the wobbling planetary gear includes three guiding holes that each receive a respective cylindrical pin mounted to the housing of the gear reduction mechanism.

18. The vehicle seat adjustment mechanism according to claim 16, wherein the first gear member is a pinion gear, wherein the second gear member is a sector gear, and wherein the first component is a seat base and the second component is a seat bottom.

19. The vehicle seat adjustment mechanism according to claim 16, wherein the gear reduction mechanism includes an eccentric rotatably connected to the drive motor and a locking plate that engages the eccentric and one of a planetary gear and a ring gear and the other of the planetary gear and the ring gear is drivingly connected to the first gear member.

20. The vehicle seat adjustment mechanism according to claim 16, wherein the first gear member is a pinion gear, wherein the second gear member is a rack, and wherein the first component is a rail and the second component is a slide unit on which a seat base is mounted.

21. The vehicle seat adjustment mechanism according to claim 16, wherein the first gear member is a pinion gear, wherein the second gear member is a ring gear, wherein the first component is a vehicle floor and the second component is a seat that is swivelable relative to the vehicle floor, and wherein the ring gear includes conical involute teeth.

* * * * *